(12) United States Patent
Nakajima et al.

(10) Patent No.: US 12,182,502 B1
(45) Date of Patent: Dec. 31, 2024

(54) SYSTEMS AND METHODS FOR AUTOMATICALLY GENERATING CONVERSATION OUTLINES AND ANNOTATION SUMMARIES

(71) Applicant: Otter.ai, Inc., Los Altos, CA (US)

(72) Inventors: Kaisuke Nakajima, Sunnyvale, CA (US); Kean Kheong Chin, Reno, NV (US); Gregory Kennedy Sell, Bremerton, WA (US); Cheng Yuan, San Jose, CA (US); Amro A. Younes, Redwood City, CA (US); Richard Norman Michael Ward, San Francisco, CA (US); Robert Firebaugh, Tiburon, CA (US); Qingyun Mao, Newark, CA (US); Amanda Song, Seattle, WA (US); Simon Lau, San Jose, CA (US); Siddharth Pradeep Sakhadeo, Milpitas, CA (US); Winfred James Jebasingh, Campbell, CA (US); Jiankai Xiao, Sunnyvale, CA (US); Shreyas Aiyar, Sunnyvale, CA (US); Frazer Hainsworth Kirkman, Sunnyvale, CA (US); Wen Sun, Sunnyvale, CA (US); Angus Ka-man Ng, San Francisco, CA (US); Sam Liang, Palo Alto, CA (US); Yun Fu, Cupertino, CA (US)

(73) Assignee: Otter.ai, Inc., Mountain View, CA (US)

(*) Notice: Subject to any disclaimer, the term of this patent is extended or adjusted under 35 U.S.C. 154(b) by 0 days.

(21) Appl. No.: 18/127,343

(22) Filed: Mar. 28, 2023

Related U.S. Application Data

(60) Provisional application No. 63/324,490, filed on Mar. 28, 2022.

(51) Int. Cl.
*G06F 40/169* (2020.01)
*G10L 17/14* (2013.01)
(Continued)

(52) U.S. Cl.
CPC ............ *G06F 40/169* (2020.01); *G10L 17/14* (2013.01); *G10L 17/18* (2013.01); *G10L 17/22* (2013.01); *G10L 25/57* (2013.01)

(58) Field of Classification Search
CPC ....... G06F 40/169; G10L 17/14; G10L 17/18; G10L 17/22; G10L 25/57
See application file for complete search history.

(56) References Cited

U.S. PATENT DOCUMENTS 6,088,669 A 7/2000 Maes
6,363,352 B1 3/2002 Dailey et al.
(Continued)

FOREIGN PATENT DOCUMENTS

JP 3376487 5/2001

OTHER PUBLICATIONS

Basu et al., "An Overview of Speaker Diarization: Approaches, Resources and Challenges," 2016 Conference of The Oriental Chapter of International Committee for Coordination and Standardization of Speechx Databases and Assessment Technique (O-COCOSDA), Bali, Indonesia, Oct. 26-28, 2016.
(Continued)

*Primary Examiner* — Huyen X Vo
(74) *Attorney, Agent, or Firm* — Faegre Drinker Biddle & Reath LLP

(57) ABSTRACT

Method, system, device, and non-transitory computer-readable medium for presenting a conversation. A computer-implemented method may include: obtaining, via a first virtual participant, a first set of audio data associated with the first conversation while the first conversation occurs;
(Continued)

transcribing the first set of audio data into a first set of text data while the first conversation occurs; obtaining a set of annotations associated with the set of text data while the first conversation occurs; identifying one or more topic transitions based at least in part upon the set of text data; generating a conversation summary based at least in part upon the one or more topic transitions; obtaining a first set of visual data associated with the conversation; and presenting the set of annotations, the conversation summary, and the first set of visual data embedded in the first set of text data to the first group of actual participants.

26 Claims, 11 Drawing Sheets

(51) Int. Cl.
    *G10L 17/18*     (2013.01)
    *G10L 17/22*     (2013.01)
    *G10L 25/57*     (2013.01)

(56) References Cited

U.S. PATENT DOCUMENTS

| | | |
|---|---|---|
| 6,434,520 B1 | 8/2002 | Kanevsky et al. |
| 6,513,003 B1 | 1/2003 | Angell et al. |
| 8,407,049 B2 | 3/2013 | Cromack et al. |
| 8,612,211 B1* | 12/2013 | Shires .................... G10L 21/10 |
| | | 704/235 |
| 8,645,138 B1 | 2/2014 | Weinstein et al. |
| 8,818,803 B2 | 8/2014 | Weber |
| 9,311,932 B2 | 4/2016 | Carter |
| 9,443,518 B1 | 9/2016 | Gauci |
| 9,571,652 B1 | 2/2017 | Zeppenfeld et al. |
| 10,339,918 B2 | 7/2019 | Hofer et al. |
| 10,388,272 B1 | 8/2019 | Thomson et al. |
| 10,573,312 B1 | 2/2020 | Thomson et al. |
| 10,616,278 B1 | 4/2020 | Johansson et al. |
| 10,630,733 B2 | 4/2020 | Modai et al. |
| 10,978,073 B1 | 4/2021 | Fu et al. |
| 11,012,575 B1 | 5/2021 | Leblang et al. |
| 11,017,778 B1 | 5/2021 | Thomson et al. |
| 11,024,316 B1 | 6/2021 | Fu et al. |
| 11,100,943 B1 | 8/2021 | Fu et al. |
| 11,222,185 B2 | 1/2022 | Waibel et al. |
| 11,330,229 B1* | 5/2022 | Crumley .......... H04N 21/47217 |
| 11,423,911 B1* | 8/2022 | Fu .......................... G10L 15/04 |
| 11,431,517 B1 | 8/2022 | Fu et al. |
| 11,657,822 B2 | 5/2023 | Fu et al. |
| 11,676,623 B1 | 6/2023 | Younes et al. |
| 11,869,508 B2 | 1/2024 | Fu et al. |
| 12,020,722 B2 | 6/2024 | Fu et al. |
| 2002/0099552 A1 | 7/2002 | Rubin et al. |
| 2004/0107256 A1 | 6/2004 | Odenwald et al. |
| 2004/0117446 A1 | 6/2004 | Swanson |
| 2005/0034079 A1 | 2/2005 | Gunasekar et al. |
| 2005/0152523 A1 | 7/2005 | Fellenstein et al. |
| 2006/0149558 A1 | 7/2006 | Kahn et al. |
| 2006/0182249 A1 | 8/2006 | Archambault et al. |
| 2007/0071206 A1 | 3/2007 | Gainsboro et al. |
| 2007/0106724 A1 | 5/2007 | Gorti et al. |
| 2007/0118374 A1 | 5/2007 | Wise et al. |
| 2007/0183458 A1 | 8/2007 | Bouazizi et al. |
| 2008/0181417 A1 | 7/2008 | Pereg et al. |
| 2008/0293443 A1 | 11/2008 | Pettinato |
| 2008/0294434 A1 | 11/2008 | Pettinato |
| 2008/0300872 A1 | 12/2008 | Basu et al. |
| 2009/0019367 A1 | 1/2009 | Cavagnari et al. |
| 2009/0030680 A1 | 1/2009 | Mamou |
| 2009/0210391 A1 | 8/2009 | Hall et al. |
| 2009/0240488 A1 | 9/2009 | White et al. |
| 2009/0306981 A1 | 12/2009 | Cromack et al. |
| 2009/0307189 A1 | 12/2009 | Bobbitt et al. |
| 2010/0146438 A1 | 6/2010 | Bush et al. |
| 2011/0228922 A1 | 9/2011 | Dhara et al. |
| 2011/0307241 A1 | 12/2011 | Waibel et al. |
| 2011/0320197 A1 | 12/2011 | Conejero et al. |
| 2012/0046936 A1 | 2/2012 | Kandekar et al. |
| 2012/0253805 A1 | 10/2012 | Rajakumar et al. |
| 2012/0275761 A1 | 11/2012 | Li et al. |
| 2012/0281921 A1 | 11/2012 | Dowell |
| 2012/0310644 A1 | 12/2012 | Zimmerman et al. |
| 2012/0323575 A1 | 12/2012 | Gibbon et al. |
| 2012/0324355 A1 | 12/2012 | Mbenkum et al. |
| 2013/0144603 A1 | 6/2013 | Lord et al. |
| 2013/0300939 A1 | 11/2013 | Chou et al. |
| 2013/0311177 A1 | 11/2013 | Bastide et al. |
| 2013/0346077 A1 | 12/2013 | Mengibar et al. |
| 2014/0029757 A1 | 1/2014 | Aronowitz et al. |
| 2014/0136999 A1 | 5/2014 | Leibovich et al. |
| 2015/0012844 A1* | 1/2015 | Paulik ................ H04L 65/1096 |
| | | 715/753 |
| 2015/0249747 A1 | 9/2015 | Box et al. |
| 2015/0255068 A1 | 9/2015 | Kim et al. |
| 2015/0310863 A1 | 10/2015 | Chen et al. |
| 2016/0004732 A1 | 1/2016 | Hsu et al. |
| 2016/0014222 A1 | 1/2016 | Chen et al. |
| 2016/0284354 A1 | 9/2016 | Chen et al. |
| 2016/0322049 A1 | 11/2016 | Bakshi et al. |
| 2017/0070706 A1 | 3/2017 | Ursin et al. |
| 2017/0169816 A1 | 6/2017 | Blandin et al. |
| 2017/0180780 A1 | 6/2017 | Jeffries |
| 2017/0199934 A1 | 7/2017 | Nongpiur |
| 2017/0294184 A1 | 10/2017 | Bradley |
| 2017/0301037 A1* | 10/2017 | Baughman ............. G06Q 10/10 |
| 2017/0329943 A1 | 11/2017 | Choi et al. |
| 2017/0372693 A1 | 12/2017 | Rangarajan Sridhar et al. |
| 2018/0007060 A1 | 1/2018 | Leblang et al. |
| 2018/0032226 A1 | 2/2018 | Ryu et al. |
| 2018/0061083 A1 | 3/2018 | Suzuki et al. |
| 2018/0143956 A1 | 5/2018 | Skarbovsky et al. |
| 2018/0174108 A1 | 6/2018 | Kang et al. |
| 2018/0197548 A1 | 7/2018 | Palakodety et al. |
| 2018/0315428 A1 | 11/2018 | Johnson et al. |
| 2018/0316893 A1 | 11/2018 | Rosenberg et al. |
| 2019/0073640 A1 | 3/2019 | Odezue et al. |
| 2019/0273767 A1 | 9/2019 | Nelson et al. |
| 2019/0341050 A1 | 11/2019 | Diamant et al. |
| 2019/0364009 A1 | 11/2019 | Joseph et al. |
| 2020/0051582 A1 | 2/2020 | Gilson |
| 2020/0145616 A1 | 5/2020 | Nassar |
| 2020/0175961 A1 | 6/2020 | Thomson et al. |
| 2020/0228358 A1 | 7/2020 | Rampton |
| 2020/0243095 A1 | 7/2020 | Adlersberg et al. |
| 2020/0257587 A1 | 8/2020 | Chau et al. |
| 2020/0365160 A1 | 11/2020 | Nassar et al. |
| 2020/0403818 A1 | 12/2020 | Daredia et al. |
| 2020/0412564 A1 | 12/2020 | Roedel et al. |
| 2021/0021558 A1 | 1/2021 | Mahmoud et al. |
| 2021/0044645 A1 | 2/2021 | Jayaweera |
| 2021/0058263 A1 | 2/2021 | Fahrendorff et al. |
| 2021/0058517 A1 | 2/2021 | Serbajlo et al. |
| 2021/0092168 A1 | 3/2021 | Ranalli et al. |
| 2021/0217420 A1 | 7/2021 | Fu et al. |
| 2021/0319797 A1 | 10/2021 | Fu et al. |
| 2021/0327454 A1 | 10/2021 | Fu et al. |
| 2021/0367802 A1 | 11/2021 | Yarlagadda |
| 2021/0369042 A1 | 12/2021 | Gustman et al. |
| 2021/0390144 A1 | 12/2021 | Ganesh |
| 2021/0407520 A1 | 12/2021 | Neckermann et al. |
| 2021/0409547 A1 | 12/2021 | Channapragada et al. |
| 2022/0122436 A1 | 4/2022 | Volkerink et al. |
| 2022/0343918 A1 | 10/2022 | Fu et al. |
| 2022/0353102 A1 | 11/2022 | Lau et al. |
| 2022/0385758 A1 | 12/2022 | Tadesse et al. |
| 2022/0414130 A1 | 12/2022 | Master Ben-Dor |
| 2023/0245660 A1 | 8/2023 | Fu et al. |
| 2023/0267948 A1 | 8/2023 | Younes et al. |
| 2023/0297765 A1 | 9/2023 | Vendrow |
| 2023/0325611 A1 | 10/2023 | Garg et al. |
| 2024/0037145 A1 | 2/2024 | Ziccardi et al. |

(56) References Cited

U.S. PATENT DOCUMENTS

| | | |
|---|---|---|
| 2024/0095440 A1 | 3/2024 | Rony et al. |
| 2024/0170006 A1 | 5/2024 | Fu et al. |
| 2024/0205037 A1 | 6/2024 | Callegari |

OTHER PUBLICATIONS

Tur et al., "The CALO Meeting Assistant System," *IEEE Transactions on Audio, Speech, and Language Processing*, vol. 18, No. 6, pp. 1601-1611, Aug. 2010.

United States Patent and Trademark Office, Office Action dated May 11, 2023, in U.S. Appl. No. 17/210,108.

United States Patent and Trademark Office, Office Action dated Dec. 8, 2022, in U.S. Appl. No. 17/242,465.

United States Patent and Trademark Office, Office Action dated Apr. 5, 2023, in U.S. Appl. No. 17/242,465.

United States Patent and Trademark Office, Office Action dated Dec. 7, 2022, in U.S. Appl. No. 17/863,837.

United States Patent and Trademark Office, Office Action dated Jul. 5, 2023, in U.S. Appl. No. 17/863,837.

United States Patent and Trademark Office, Office Action dated Dec. 7, 2022, in U.S. Appl. No. 17/863,881.

United States Patent and Trademark Office, Office Action dated Jul. 5, 2023, in U.S. Appl. No. 17/863,881.

United States Patent and Trademark Office, Notice of Allowance mailed Oct. 12, 2023, in U.S. Appl. No. 17/210,108.

United States Patent and Trademark Office, Office Action mailed Oct. 17, 2023, in U.S. Appl. No. 17/863,837.

United States Patent and Trademark Office, Office Action mailed Oct. 24, 2023, in U.S. Appl. No. 17/863,881.

United States Patent and Trademark Office, Office Action mailed Nov. 15, 2023, in U.S. Appl. No. 18/131,982.

United States Patent and Trademark Office, Notice of Allowance mailed Mar. 4, 2024, in U.S. Appl. No. 17/863,881.

United States Patent and Trademark Office, Office Action mailed Apr. 4, 2024, in U.S. Appl. No. 18/131,982.

United States Patent and Trademark Office, Office Action mailed Mar. 25, 2024, in U.S. Appl. No. 18/140,981.

United States Patent and Trademark Office, Office Action mailed Mar. 29, 2024, in U.S. Appl. No. 18/438,145.

United States Patent and Trademark Office, Office Action mailed Jun. 4, 2024, in U.S. Appl. No. 17/863,837.

United States Patent and Trademark Office, Notive of Allowance mailed Jul. 23, 2024, in U.S. Appl. No. 18/438,145.

United States Patent and Trademark Office, Office Action mailed Sep. 9, 2024, in U.S. Appl. No. 17/863,837.

United States Patent and Trademark Office, Office Action mailed Jul. 26, 2024, in U.S. Appl. No. 18/131,982.

United States Patent and Trademark Office, Office Action mailed Aug. 5, 2024, in U.S. Appl. No. 18/140,981.

United States Patent and Trademark Office, Office Action mailed Aug. 15, 2024, in Application No. 18/514,666.

United States Patent and Trademark Office, Office Action mailed Sep. 10, 2024, in U.S. Appl. No. 18/673,235.

United States Patent and Trademark Office, Office Action mailed Aug. 13, 2024, in U.S. Appl. No. 18/744,259.

United States Patent and Trademark Office, Notice of Allowance mailed Oct. 10, 2024, in U.S. Appl. No. 18/140,981.

United States Patent and Trademark Office, Office Action mailed Oct. 11, 2024, in U.S. Appl. No. 18/438,145.

\* cited by examiner

Carl H assigned to you

Weekly Meeting
Yesterday at 10:30 am

ACTION ITEMS

- Follow up with the client on delivery date
- Send over latest contract and get it signed by Friday
- Gather compliance details so engineering can start evaluation View all 2  4  6  1

SYSTEMS AND METHODS FOR AUTOMATICALLY GENERATING CONVERSATION OUTLINES AND ANNOTATION SUMMARIES

CROSS-REFERENCES TO RELATED APPLICATIONS

This application claims priority to U.S. Provisional Patent Application No. 63/324,490, filed Mar. 28, 2022, which is incorporated herein by reference in its entirety for all purposes.

U.S. patent application Ser. No. 17/678,676, U.S. patent application Ser. No. 16/027,511, U.S. patent application Ser. No. 16/276,446, U.S. patent application Ser. No. 16/403, 263, U.S. patent application Ser. No. 16/598,820, and U.S. patent application Ser. No. 16/780,630 are incorporated by reference herein for all purposes.

FIELD OF THE DISCLOSURE

Some embodiments of the present disclosure are directed to signal processing. More particularly, certain embodiments of the present disclosure provide systems and methods for automatically generating conversation outlines and annotation summaries. Merely by way of example, the present disclosure has been applied to conversations captured in audio form, but it would be recognized that the present disclosure has much broader range of applicability.

BACKGROUND

Conversations, such as human-to-human conversations, include information that is often difficult to comprehensively, efficiently, and accurately extract, using conventional methods and systems. For example, conventional note-taking performed during a conversation not only distracts the note-taker from the conversation but can also lead to inaccurate recordation of information due to human-error, such as for human's inability to multitask well and process information efficiently with high accuracy in real time. Hence, it is highly desirable to provide systems and methods for capturing, processing, and rendering conversations (e.g., in an automatic manner) to increase the value of conversations, such as human-to-human conversations, at least by increasing the comprehensiveness and accuracy of information extractable from the conversations.

BRIEF SUMMARY OF THE DISCLOSURE

Some embodiments of the present disclosure are directed to signal processing. More particularly, certain embodiments of the present disclosure provide systems and methods for automatically generating conversation outlines and annotation summaries. Merely by way of example, the present disclosure has been applied to conversations captured in audio form, but it would be recognized that the present disclosure has much broader range of applicability.

According to various embodiments, a computer-implemented method for performing one or more processes, a system for performing one or more processes, and a non-transitory computer-readable medium storing instructions upon execution by one or more processors of a computing system cause the computing system to perform one or more processes. The one or more processes includes: obtaining, via a first virtual participant, a first set of audio data associated with the first conversation while the first conversation occurs; transcribing the first set of audio data into a first set of text data while the first conversation occurs; obtaining a set of annotations associated with the set of text data while the first conversation occurs; identifying one or more topic transitions based at least in part upon the set of text data; generating a conversation summary based at least in part upon the one or more topic transitions; obtaining a first set of visual data associated with the conversation, each visual data of the first set of visual data corresponding to a timestamp; and presenting the set of annotations, the conversation summary, and the first set of visual data embedded in the first set of text data to a group of actual participants.

In some embodiments, a computer-implemented method for presenting a conversation, the method comprises: obtaining, via a virtual participant, a set of audio data associated with a conversation while the conversation occurs; transcribing, via the virtual participant, the set of audio data into a set of text data while the conversation occurs; obtaining a set of annotations associated with the set of text data while the conversation occurs; identifying one or more topic transitions based at least in part upon the set of text data; generating a conversation summary based at least in part upon the one or more topic transitions; obtaining a set of visual data associated with the conversation, each visual data of the set of visual data corresponding to a timestamp; and presenting the set of annotations, the conversation summary, and the set of visual data embedded in the set of text data to a group of actual participants.

In certain embodiments, a computing system for presenting a conversation, the computing system comprises: one or more processors; and a memory storing instructions that, upon execution by the one or more processors, cause the computing system to perform one or more processes including: obtaining, via a virtual participant, a set of audio data associated with a conversation while the conversation occurs; transcribing, via the virtual participant, the set of audio data into a set of text data while the conversation occurs; obtaining a set of annotations associated with the set of text data while the conversation occurs; identifying one or more topic transitions based at least in part upon the set of text data; generating a conversation summary based at least in part upon the one or more topic transitions; obtaining a set of visual data associated with the conversation, each visual data of the first set of visual data corresponding to a timestamp; and presenting the set of annotations, the conversation summary, and first set of visual data embedded in the first set of text data to a group of actual participants.

In some embodiments, a non-transitory computer-readable medium storing instructions for presenting a conversation, the instructions upon execution by one or more processors of a computing system, cause the computing system to perform one or more processes including: obtaining, via a virtual participant, a set of audio data associated with a conversation while the conversation occurs; transcribing, via the virtual participant, the first set of audio data into a first set of text data while the conversation occurs; obtaining a set of annotations associated with the set of text data while the conversation occurs; identifying one or more topic transitions based at least in part upon the set of text data; generating a conversation summary based at least in part upon the one or more topic transitions; obtaining a first set of visual data associated with the conversation, each visual data of the first set of visual data corresponding to a timestamp; and presenting the set of annotations, the conversation summary, and the set of visual data embedded in the set of text data to a group of actual participants.

In certain embodiments, a computer-implemented method for presenting a conversation, the method comprising: obtaining, via a virtual participant, a set of audio data associated with a conversation while the conversation occurs; transcribing, via the virtual participant, the set of audio data into a set of text data while the conversation occurs; obtaining a set of annotations associated with the set of text data while the conversation occurs; identifying one or more topic transitions based at least in part upon the set of text data; generating a plurality of headings for a plurality of conversation topics based at least in part on the set of text data and the one or more topic transitions by applying a machine learning model to the set of text data; generating a conversation summary based at least in part upon the one or more topic transitions, the conversation summary including the plurality of headings; obtaining a set of visual data associated with the conversation, each visual data of the set of visual data corresponding to a timestamp; and presenting the set of annotations, the conversation summary, and the set of visual data embedded in the set of text data to a group of actual participants; wherein the identifying one or more topic transitions comprises at least selected from a group consisting of: identifying a change in speakers; identifying a change in screenshare; identifying a change in cue words; identifying a pause in a conversation; and identifying a change in sematic meaning of two or more conversation segments.

Depending upon the embodiment, one or more benefits may be achieved. These benefits, features, and advantages of the present disclosure can be fully appreciated with reference to the detailed description and accompanying drawings that follow.

BRIEF DESCRIPTION OF THE DRAWINGS

FIG. 9 is a simplified diagram showing a user interface with a reminder according to various embodiments of the present disclosure.

FIG. 10 is a simplified diagram showing a user interface with a conversation outline according to various embodiments of the present disclosure.

FIG. 11 is a simplified diagram showing a user interface with an annotation summary according to various embodiments of the present disclosure.

Figure 1:
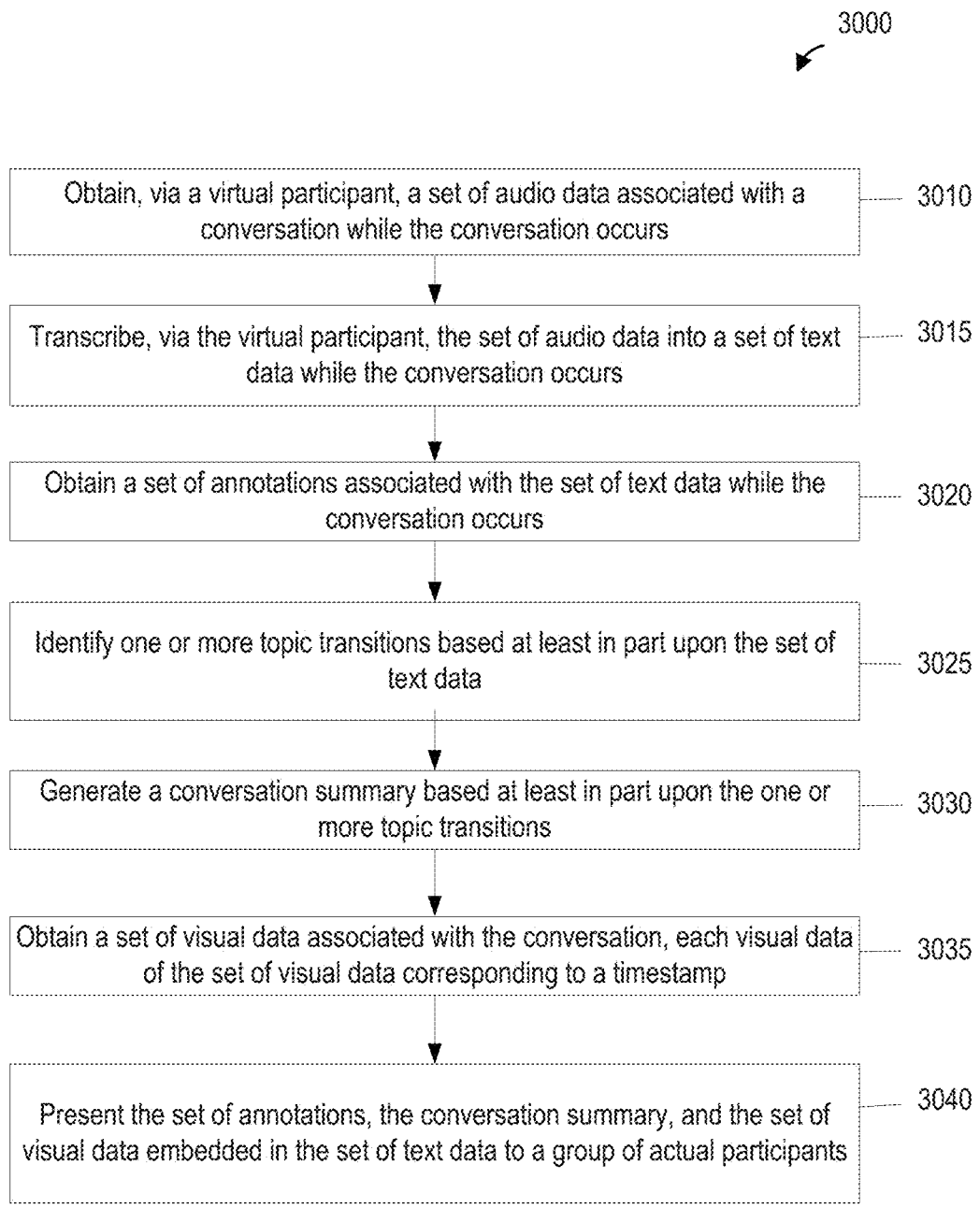
FIG. 1 is a simplified diagram showing a method for generating conversation summaries according to certain embodiments of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DRAWINGS

Some embodiments of the present disclosure are directed to signal processing. More particularly, certain embodiments of the present disclosure provide systems and methods for automatically generating conversation outlines and annotation summaries. Merely by way of example, the present disclosure has been applied to conversations captured in audio form, but it would be recognized that the present disclosure has much broader range of applicability.

Systems and/or methods of the present disclosure relate to capturing, processing (e.g., embedding into a transcript), and/or sharing of visual data (e.g., a screenshot, an image, a photograph) in association with a conversation according to various embodiments. In some examples, a virtual assistant, which may also be referred to as a virtual conversation participant, may be used to automatically capture, process, and/or share the visual data. In certain examples, a virtual assistant may, upon receiving an instruction (e.g., via text and/or audio) from a user (e.g., via an interface on a client device), capture, process, and/or share the visual data. In some examples, the visual data may be a still visual data (e.g., a still snapshot of a shared screen, an image displayed in a document or shared screen), or part of a video including video and sound. In certain examples, a video snapshot including a small period of image data and the associated audio data may be captured, processed, and/or shared.

Systems and/or methods of the present disclosure relate to automatically joining a virtual assistant, such as based on a calendared event according to various embodiments. In certain examples, the virtual assistant may be joined into an event (e.g., a conversation) upon user intervention (e.g., via a conferencing system). In various examples, once joined into the event, the virtual assistant is configured to capture, process, and/or share visual data. In certain examples, a data store and a secure web server may be implemented to service live transmission of visual data and/or video data to a client, such as for embedding into a conversation transcript (e.g., live or asynchronously).

Systems and/or methods of the present disclosure relate to embedding multimedia (e.g., audio segments, images, video segments) into a conversation (e.g., speech) transcript, either in real-time or post-conversation according to various embodiments. In various examples, systems and/or methods of the present disclosure relate to the automatic capturing and presenting (e.g., as a suggestion) of a piece of audio segment, visual image, and/or video segment to a user (e.g., via a client device), such as along with a conversation transcript. In some examples, the user (e.g., via a client device), upon receiving the captured data, may determine whether to insert the captured data into the transcript. In some examples, the user (e.g., via a client device) may simply click directly on the captured data to confirm them for embedding. In various examples, the audio segment, visual image, and/or video segment may be embedded into a live transcript of a live conversation, such as directly via a user command (e.g., via text or audio), and/or automatically by a virtual assistant (e.g., guided by one or more user preferences and/or one or more presets).

In some examples, the embedded data is arranged along with the transcript per the time the embedded data was captured. In certain examples, the audio segment, visual image, and/or video segment may be embedded into a full transcript of an already-occurred conversation (e.g., from a recording of a conversation). In various examples, when multiple conversation participants (e.g., virtual conversation participants) collaborate on a master transcript of a conversation, systems and/or methods of the present disclosure relate to removing duplicate embedding of data. In some examples, speaking identification may be performed collaboratively by the multiple conversation participants (e.g., virtual conversation participants) conversation participants, where the identity of the speaker may guide the selection of a representative audio segment, visual image, and/or video segment as the embedded data. In various examples, a virtual conversation participant may identify a speaker during a conversation by at least monitoring the speaker's dedicated audio channel and/or based on the meta data provided by a conferencing system. In some examples, the virtual conversation participant may next embed the speaker-identified section of the transcript into the transcript (e.g., live and/or master). In certain examples, the monitoring of multiple speaker-associated audio channels allows improved transcript accuracy and/or speed in detecting speaker changes as well as the transcript itself. In some examples, systems and/or methods of the present disclosure may enable snapshotting functions of audio, visual, and/or video data via virtual assistants whenever a screen is shared during a conversation.

Systems and/or methods of the present disclosure relate to capturing and presenting suggested data for embedding into a transcript during a live conversation according to various embodiments. Such capturing and presenting of suggested data may be referred to as surfacing of suggested data. In various examples, surfacing of suggested data may involve joining one or more virtual conversation participants into a live conversation, streaming conversation content, such as via a video streaming engine and/or an image capture engine, to a data store. In various examples, once transmitted to the data store, the conversation content may be accessed by one or more users (e.g., conversation participants) while the conversation is live and/or after the conversation ends. In various examples, surfacing of suggested data may further involve generating transcript based on the conversation content (e.g., audio data and/or image data) and transmitting the transcript, such as along with the conversation content, to one or more client devices for viewing and/or manipulation. In some examples, one or more users (e.g., conversation participants) receiving the transcript may add annotations to the transcript, such as via a transcript annotation engine. In some examples, video snippets may be created and embedded into the conversation content, such as via a video capture component configured to stream video into the data store.

In certain examples, when automatic embedding of image data is enabled, systems and/or methods of the present disclosure may detect changes in image content (e.g., via an image capture engine) displayed in a shared screen. In some examples, upon detecting changes in image content more than a predetermined threshold, a snapshot is taken and embedded automatically into the transcript (e.g., through an API server). In various examples, a user, such as via a client device, may edit and override the automatically embedded image content. In some examples, when automatic embedding of image data is disabled, image content may be captured at regular intervals and presented to a user (e.g., by websocket or through the transcript annotation engine) to update the user (e.g., via a client device) the suggested image data to be embedded into a conversation transcript. In certain examples, the suggested image data may be presented in the form of a thumbnail that a user (e.g., via a client device) may interact with to manually embed the suggested image data into the conversation transcript. In various examples, the transcript annotation engine is configured to receive notification from image capture engine to post a new snapshot that is captured. In certain examples, the snapshot may contain information such as a secure URL where the image may be retrieved. In some examples, a client device (e.g., controlled by a user via a front-end user interface that displays the transcripts) may retrieve the image for display in accordance with a time offset such that the image is embedded to the part of the transcript at the time it was captured (e.g., in relation to when the conversation recording started). In various examples, streamlining of visual data, capturing and/or suggesting of visual data, and embedding of visual data may be repeated, such as continually, throughout a conversation participated by one or more virtual assistants.

Systems and/or methods of the present disclosure relate to embedding images and/or video into live transcript during a live conversation (e.g., meeting), such as either by user request or automatic embedding based on user preferences according to various embodiments. In various examples, a client device (e.g., a web or mobile application) may render real-time transcript to one or more users. In certain examples, a websocket is established between the client device and a streaming server and a Pub Sub ("publish-subscribe") system. In various examples, the client device may transparently calibrate with one or more virtual assistants, such as when a live transcript began so that any offsets provided when a new visual data capture (e.g., screenshot) becomes available, it is embedded into the transcript at a time corresponding to when the visual data was captured (e.g., in relation to the meeting transcript). In some examples, one or more virtual assistants may send one or more suggested visual data captured at regular time intervals. In certain examples, metadata is accompanied along with the suggested visual data captured for a client device displaying a transcript to pull if the user is detected (e.g., via a client device) to be actively looking at a screen (e.g., by hovering pointer onto the suggest visual data captured). In various examples, the metadata may include a secure image URL and/or time offset since transcript started to indicate when the visual data (e.g., screenshot) was captured. In various examples, a user (e.g., via a client device) may click on a thumbnail representing the captured visual data to embed the visual data into a transcript. In certain examples, the thumbnail is rendered at a client device at regular intervals as the virtual assistant capture new visual data for suggested embedding. In various examples, a user (e.g., via a client device) may instruct the API server to embed an image (e.g., in higher resolution, such as original resolution) represented by the thumbnail into the transcript by clicking on the thumbnail. In some examples, metadata (e.g., URL of image, time offset in transcript) is exchanged between the client device and the API server when embedded occurs. In some examples, client device may stream audio transcript and/or images embedded in the transcript (e.g., rendered and visible to any user viewing the same transcript). In certain examples, images may be embedded by other users on other client devices. In various examples, the users (e.g., via their client devices) may be collaborating on the same transcript such that any image embedded by a user (e.g., via a client device) may be shared with all other users so that the image is visible on the client devices associated with the other users. In some examples, when automatic image capture is enabled, a client device may receive updates of the transcript with the embedded image to render to the user associated with the client device. In various examples, a user (e.g., via a client device) may highlight a specific section of the transcript and/or request a recording of a video segment corresponding to the specific section of the transcript (e.g., in time), which may then be embedded into the transcript. In certain examples, when another user (e.g., via another client device) has already requested an image or video be embedded within the same time frame, the system, such as via one or more virtual assistants, may de-duplicate the requests to avoid multiple occurrences of the same image or video to appear in the transcript.

Systems and/or methods of the present disclosure relate to embedding images and/or video segments into a section of a transcript that corresponds to a time in the past, either while a corresponding conversation is still ongoing or has finished according to various embodiments. In various examples, one or more steps may be similar to or identify to embedding images and/or video into live transcript during a live conversation, as discussed above. In some examples, the presenting of thumbnails may be omitted. In certain examples, users may highlight text and/or request a video snippet or an image to be embedded into the transcript in similar matter as when embedding images and/or video into live transcript during a live conversation. In some examples, a client device may provide a gallery of images that took place during a conversation which the user (e.g., via a client device) can select, which may then be automatically embedded into the transcript at the point in time when they were captured. The gallery of images may be ones an image capture engine took, such as when image changes were detected during screen share.

Systems and/or methods of the present disclosure relate to generating and presenting of a user interface with extensive flow to obtain one or more images (e.g., from one or more virtual assistants or virtual participants of a conversation) according to various embodiments. In certain examples, the process of obtaining the one or more images may be initiated by a user interacting with the user interface and/or through machine learning. As an example, one or more virtual participants may automatically, through machine learning, determine, obtain, and/or embed one or more images (or other visual data) into a conversation transcript. In various examples, systems and/or methods of the present disclosure automatically capture screenshots (e.g., either at pre-determined intervals or when a conversation topic change is detected) and either include the screenshots into a conversation transcript and/or allow a user to choose whether to include the screenshots or not. In some examples, the screenshots may be presented as thumbnails along with the transcribed text and/or topic headings in a conversation outline.

In various examples, a virtual participant is configured to detect individual speakers and identify speaker identities. In some examples, such speaker identification may be accomplished via dedicated audio channels where each audio channel obtains (e.g., record, stream) one or more audio data from one or more audio sources (e.g., speakers). In certain examples, such speaker identification may be accomplished via one or more SDKs and/or APIs of an integrated conference system. In some examples, utilizing conference system APIs and/or SDKs in the automatic joining of one or more virtual participants may improve impressiveness of the conversation for active participants of a conversation.

Systems and/or methods of the present disclosure relate to automatically generating of conversation outlines according to various embodiments. In various examples, the generating of conversation outlines includes identifying topic changes, which may involve identifying change in speaker, change in screenshare, change in cue words (e.g., repeating words or phrases), pauses in a conversation, and/or change in semantic meaning of speech segments (e.g., neighboring segments).

Systems and/or methods of the present disclosure relate to generating and presenting an interactive calendar interface allowing a user to integrate one or more calendars (e.g., Google Calendar, Microsoft Outlook Calendar) into a conversation management system according to various embodiments. In some examples, systems and/or methods of the present disclosure may automatically pull scheduled conversations (e.g., Zoom meetings, Microsoft Team meetings, or Cisco WebEx meetings) from the integrated calendars according to various embodiments. In various examples, the interactive calendar interface is configured to allow a user to view past, current, and future conversations scheduled according to the integrated one or more calendars. In some examples, the interactive calendar interface is configured to allow a user to navigate, modify, add, remove, and/or share a conversation, audio data associated with the conversation, visual data associated with the conversation, outlines associated with the conversation, and/or annotations associated with the conversation. In certain examples, the interactive calendar interface is configured as a calendar grid presenting all events in a day, a week, or a month. In some examples, the interactive calendar interface includes a conversation list configured with controls for sharing, joining a virtual participant for one or more conversations, and for virtual participant scheduling.

Systems and/or methods of the present disclosure relate to generating and presenting a reminder interface (e.g., in the form of card feeds), which may include relevant activities for a user (e.g., to avoid missing collaborative activities) according to various embodiments. In some examples, the reminder interface may include a priority section including important annotation activities in conversations, including comments mentioning the particular user, action items assigned to the particular user, highlights, comments, and/or action items created by the particular user. In certain examples, the reminder interface may include a "shared with you" section including conversations, annotations, and/or action items shared with the particular user. In certain examples, the reminder interface may include an "other activities" section including ready-to-view transcripts, transcripts that are in process, and/or speaker identification editing.

Systems and/or methods of the present disclosure relate to generating and presenting of conversation outlines, such as to help a user (e.g., via a client device) navigate recorded conversations according to various embodiments. In various examples, a conversation outline of the present disclosure may include automatically separated conversation topics where each conversation topic is associated with one or more conversation segments. In various examples, each conversation segment is spoken by one speaker. In some examples, the generating and presenting of conversation outlines includes determining, such as through a machine learning model, headings for the identified conversation topics. In certain examples, users are allowed to edit the automatically identified conversation topics and their corresponding headings. For example, systems and/or methods of the present disclosure may determine a start time and/or an end time for each identified conversation topic, or alternatively, simply identifying one or more times where the conversation topic changes throughout the conversation. A user (e.g., via a client device) may then be allowed to modify the start times, end times, and/or transition times. In some examples, such changes may be shared to one or more other participants of the conversation, such as automatically. In certain examples, the determining of topic headings may involve determining key words or phrases with semantic relevance.

Systems and/or methods of the present disclosure relate to generating and presenting annotation summaries, such as ones related to conversations that have been recorded and/or transcribed, or conversations that are being recorded, streamed, and/or transcribed according to various embodiments. In some examples, the annotation summaries are presented in a summary interface showing highlights, text notes, audio notes, action items, and/or comments regarding any of the foregoing. In various examples, the annotation summaries show the user who created and/or the user who are assigned to each highlight, text note, audio note, action item, and/or comment. In certain examples, the annotation summaries include timestamps corresponding to each highlight, text note, audio note, action item, and/or comment such that each of the annotations relate to a certain timestamp of the conversation. In various examples, a user (e.g., via a client device) may select an annotation in the summary interface and the corresponding section of the conversation will show.

FIG. 1 is a simplified diagram showing a method 3000 for generating conversation summaries according to certain embodiments of the present disclosure. This diagram is merely an example. One of ordinary skill in the art would recognize many variations, alternatives, and modifications. The method 3000 for generating conversation summaries includes processes 3010, 3015, 3020, 3025, 3030, 3035, and 3040. Although the above has been shown using a selected group of processes for the method 3000 for generating conversation summaries, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 3000 are performed by a system (e.g., the computing system 100). In certain examples, some or all processes (e.g., steps) of the method 3000 are performed by a computer and/or a processor directed by a code. For example, a computer includes a server computer and/or a client computer (e.g., a personal computer). In some examples, some or all processes (e.g., steps) of the method 3000 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, the method 3000 includes a process 3010 of obtaining, via a virtual participant, a set of audio data associated with a conversation while the conversation occurs. In certain embodiments, a virtual participant includes a software module to capture audio data during a meeting or a conversation, generate a transcript from the audio data, for example, when the meeting or the conversation is on-going. In some embodiments, the method 3000 includes a process 3015 of transcribing, via the virtual participant, the set of audio data into a set of text data while the conversation occurs. In certain embodiments, the method 3000 includes a process 3020 of obtaining a set of annotations associated with the set of text data while the conversation occurs. In some embodiments, the method 3000 includes a process 3025 of identifying one or more topic transitions based at least in part upon the set of text data.

According to certain embodiments, the method 3000 includes a process 3030 of generating a conversation summary based at least in part upon the one or more topic transitions. In some embodiments, the method 3000 includes a process 3035 of obtaining a set of visual data associated with the conversation, each visual data of the set of visual data corresponding to a timestamp. In certain embodiments, the method 3000 includes a process 3040 of presenting the set of annotations, the conversation summary, and the set of visual data embedded in the set of text data to a group of actual participants.

According to some embodiments, the method 3000 includes the method 3000 includes a process (not illustrated) of generating a plurality of headings for a plurality of conversation topics based at least in part on the set of text data and the one or more topic transitions; where the conversation summary includes the plurality of headings. In certain embodiments, the generating a plurality of headings comprises generating at least one of the plurality of headings based at least in part on one or more key words. In some embodiments, the generating a plurality of headings comprises applying a machine learning model to the set of text data to generate at least one of the plurality of headings.

According to certain embodiments, the machine learning model includes a sequence-to-sequence machine learning model or a sequence-to-sequence neural network. In some embodiments, the method 3000 includes a process (not illustrated) of receiving an input from a user; and updating time information for one of the plurality of conversation topics based on the input; wherein the time information includes at least one selected from a group consisting of a start time, an end time and a transition time. In certain embodiments, the method 3000 includes a process (not illustrated) of generating metadata associated with each visual data of the set of visual data; wherein the metadata includes at least one selected from a group consisting of a link to a respective visual data and a time offset for the respective visual data from a beginning of the conversation.

According to some embodiments, the respective visual data is embedded in the set of text data based at least in part on the time offset. In certain embodiments, the obtaining a set of visual data associated with the conversation comprises automatically obtaining the set of visual data. In some embodiments, the obtaining a set of visual data associated with the conversation comprises: capturing a sequence of visual data at regular time intervals; receiving an input associated with one visual data in the sequence of visual data; and selecting the one visual data based on the input; and embedding the one selected visual data in the set of text data.

According to certain embodiments, the receiving an input associated with one visual data in the sequence of visual data comprises receiving the input associated with a thumbnail representing the one visual data in the sequence of visual data. In some embodiments, the method 3000 includes a process (not illustrated) of embedding at least one of the set of visual data to the set of text data at a time prior to a current time of the conversation. In certain embodiments, the method 3000 includes a process (not illustrated) of generating an annotation summary including the one or more annotations and one or more corresponding timestamps.

According to some embodiments, the method 3000 includes a process (not illustrated) of receiving a selection of an annotation from the one or more annotations; and identifying a conversation segment associated with the selected annotation. In certain embodiments, the identifying one or more topic transitions comprises at least selected from a group consisting of: identifying a change in speakers; identifying a change in screenshare; identifying a change in cue words; identifying a pause in a conversation; and identifying a change in sematic meaning of two or more conversation segments. In some embodiments, the method 3000 includes a process (not illustrated) of identifying a first speaker associated with a first audio channel; and identifying a second speaker associated with a second audio channel, the second audio channel being different from the first audio channel; wherein the identifying one or more topic transitions comprises identifying the one or more topic transitions based at least in part on the identified first speaker and the identified second speaker.

Figure 2:
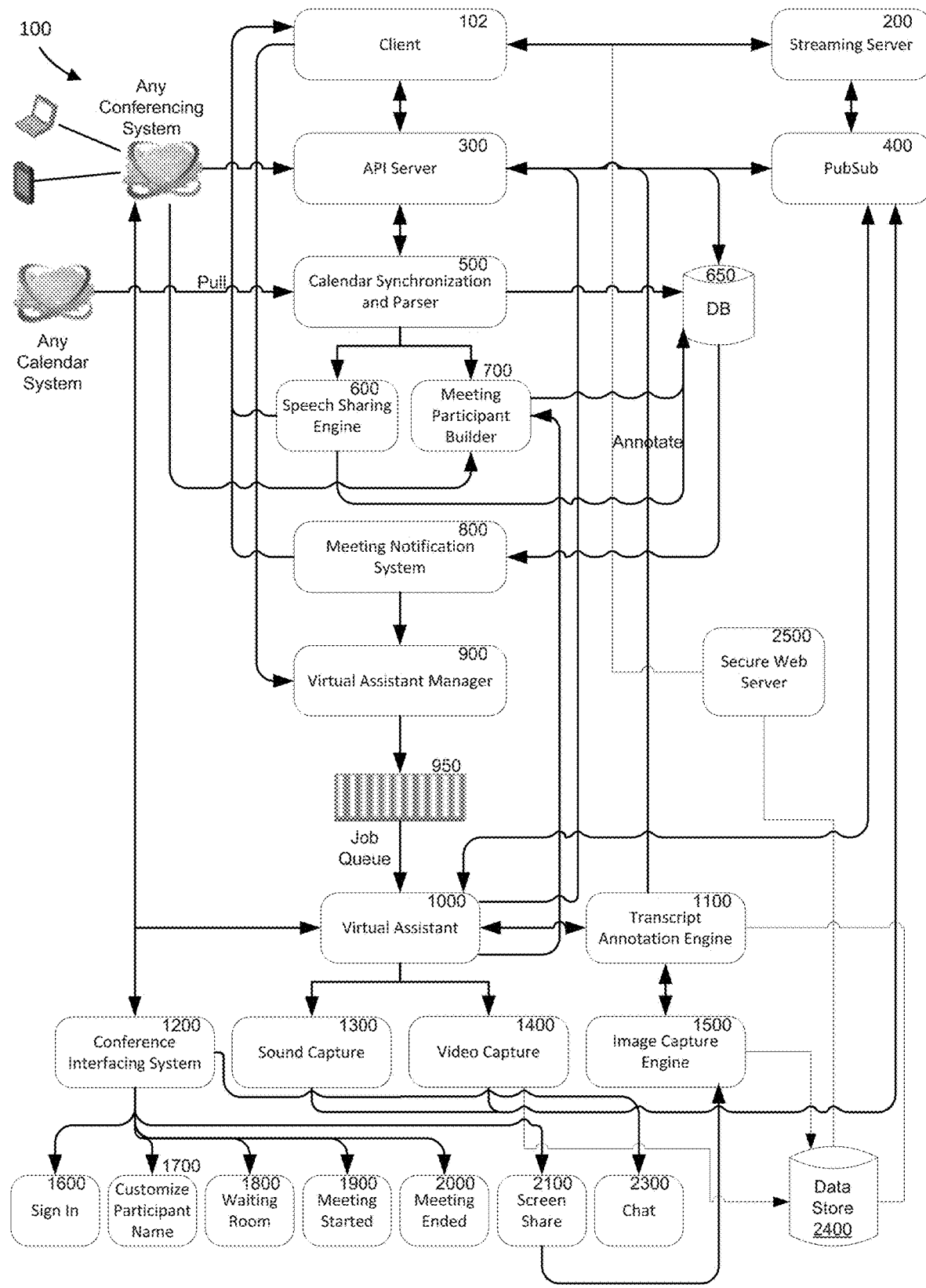
FIG. 2 is a simplified diagram showing a system for capturing and sharing of visual data via a virtual assistant according to various embodiments of the present disclosure.

FIG. 2 is a simplified diagram showing a system 100 for capturing and sharing of visual data (e.g., screenshots, images) via a virtual assistant (e.g., a virtual conversation participant) according to various embodiments of the present disclosure. This diagram is merely an example, which should not unduly limit the scope of the claims. One of ordinary skill in the art would recognize many variations, alternatives, and modifications. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In some examples, the system 100 includes a client module 102 (e.g., a piece of software, a software module) running on a client device, a streaming server 200, an API (application programming interface) server 300, a Pub Sub module 400 (e.g., a Pub Sub server), a calendar synchronization and parser module 500, a database 650, a speech sharing engine 600, a meeting participant builder 700, a meeting notification system 800, a virtual assistant manager 900, a job queue module 950, a virtual assistant 1000 (e.g., a virtual assistant module, a vendor agnostic virtual assistant, a virtual assistant system), a transcript annotation engine 1100, a conference interfacing system 1200, a sound capturing module 1300, a video capturing module 1400, an image capturing engine 1500, a data store 2400 (e.g., a database, a data repository), a secure web server 2500, and a plurality of sub-modules. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In certain embodiments, the virtual assistant 1000 interfaces with and/or coordinates with various components in the system 100. In some examples, the plurality of sub-modules includes a sign-in module 1600 for signing in, a customization module 1700 (e.g., customizing participant name), a waiting room module 1800, a meeting start module 1900, a meeting ended module 2000, a screen share module 2100 (e.g., screen capture), and/or a chat module 2300. One or more of the modules may work with a detector or includes a detector to perform its function.

In some examples, the calendar synchronization and parser module 500 is configured to pull calendar information from a calendar system, such as an external calendar system, such as a calendar system operated by a third-party.

In some examples, the conference interfacing system 1200 is configured to interact with a conferencing system, such as an external conferencing system, such as one operated by a third-party. In certain examples, the conferencing system is accessible by a plurality of devices, such as a plurality of mobile devices of a plurality of users.

In some examples, the client module 102 may manually launch the virtual assistant manager 900 to perform one or more actions.

In some examples, the transcript annotation engine 1100 is configured to annotate captured content (e.g., video, picture, audio) and/or transmit the annotated captured content to the API server 300.

In certain embodiments, the data store 2400 receives one or more captured videos from video capturing module 1400 and one or more captured images from the image capturing engine 1500. In some embodiments, the transcript annotation engine 1100 retrieves visual data (e.g., captured videos, captured images, etc.) from the data store 2400. In certain embodiments, the transcript annotation engine 1100 receives one or more inputs (e.g., user inputs, inputs via software interface). In some embodiments, the transcript annotation engine 1100 selects one or more visual data based on the one or more inputs. In certain embodiments, the transcript annotation engine 1100 selects one or more visual data automatically, for example, based at least in part on a topic transition. In some embodiments, the transcript annotation engine 1100 receives one or more annotations from the API server 300 and one or more client devices 102.

In certain embodiments, the transcript annotation engine 1100 embeds one or more selected (e.g., automatically selected, user selected, etc.) visual data and one or more annotations into a transcript (e.g., a conversation transcript). In some embodiments, the annotated transcript is stored in the data store 2400. In certain embodiment, an annotated transcript refers to a set of text data that is transcribed from audio including one or more visual data and one or more annotations embedded.

In some embodiments, the secure web server 2500 retrieves annotated transcript from the data store 2400. In certain embodiments, the secure web server 2500 provides the annotated transcript to one or more client modules 102 running on client devices.

In certain embodiments, the virtual assistant 1000 is configured to transmit one or more annotated transcripts to a Pub Sub server 400. In some embodiments, the client module 102 (e.g., a client software, a client software run on a client device) can retrieve (e.g., via subscription, via pull) transcripts from the Pub Sub server 400.

In some embodiments, the repository 650 and/or the data store 2400 can include audio data, visual data, transcripts, annotations, account information, and/or the like. The repository 430 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the system 100 can execute software or firmware stored in non-transitory computer-readable medium to implement various processing steps. Various components and processors of the system 100 can be implemented by one or more computing devices including, but not limited to, circuits, a computer, a cloud-based processing unit, a processor, a processing unit, a microprocessor, a mobile computing device, and/or a tablet computer. In some cases, various components of the system 100 can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the system 100 can be implemented in software or firmware executed by a computing device.

Various components of the system 100 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 3:
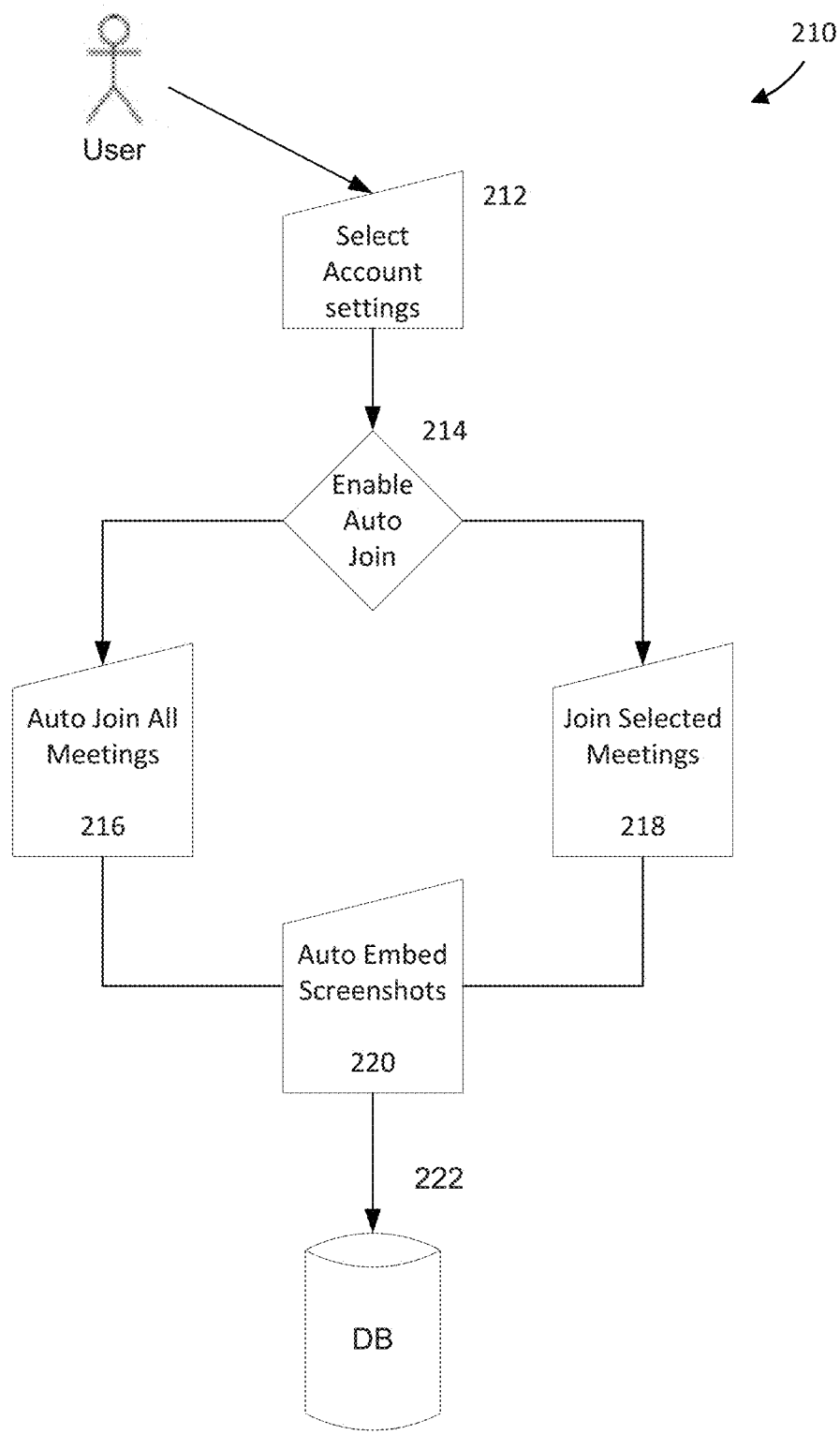
FIG. 3 is a simplified diagram showing a method for embedding screenshots via a virtual assistant according to various embodiments of the present disclosure.

FIG. 3 is a simplified diagram showing a method 210 for embedding screenshots via a virtual assistant (e.g., a virtual conversation participant, the virtual assistant 1000) according to various embodiments of the present disclosure. In various examples, the method includes configuring how screenshots may be embedded, such as via user intervention and/or automatically by a system (e.g., on behalf of a user) of the present disclosure. This diagram is merely an example, which should not unduly limit the scope of the claims. One of ordinary skill in the art would recognize many variations, alternatives, and modifications. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

According to certain embodiments, the method 210 includes a process 212 of selecting account settings, a process 214 of enabling auto join, a process 216 of automatically joining all meetings or a process 218 of joining selected meetings, a process 220 of automatically embedding screenshots to one or more transcripts, and a process 222 of transmitting transcript and meeting data to a database (e.g., the data store 650, the data store 2400). In certain embodiments, a screenshot (e.g., a snapshot) refers to visual data (e.g., an image, a video, a video section, etc.). In some examples, one or more of process 212, process 214, process 216, process 218, process 220, and/or process 222 may be performed by one or more modules (e.g., one or more components of the system 100).

Figure 4:
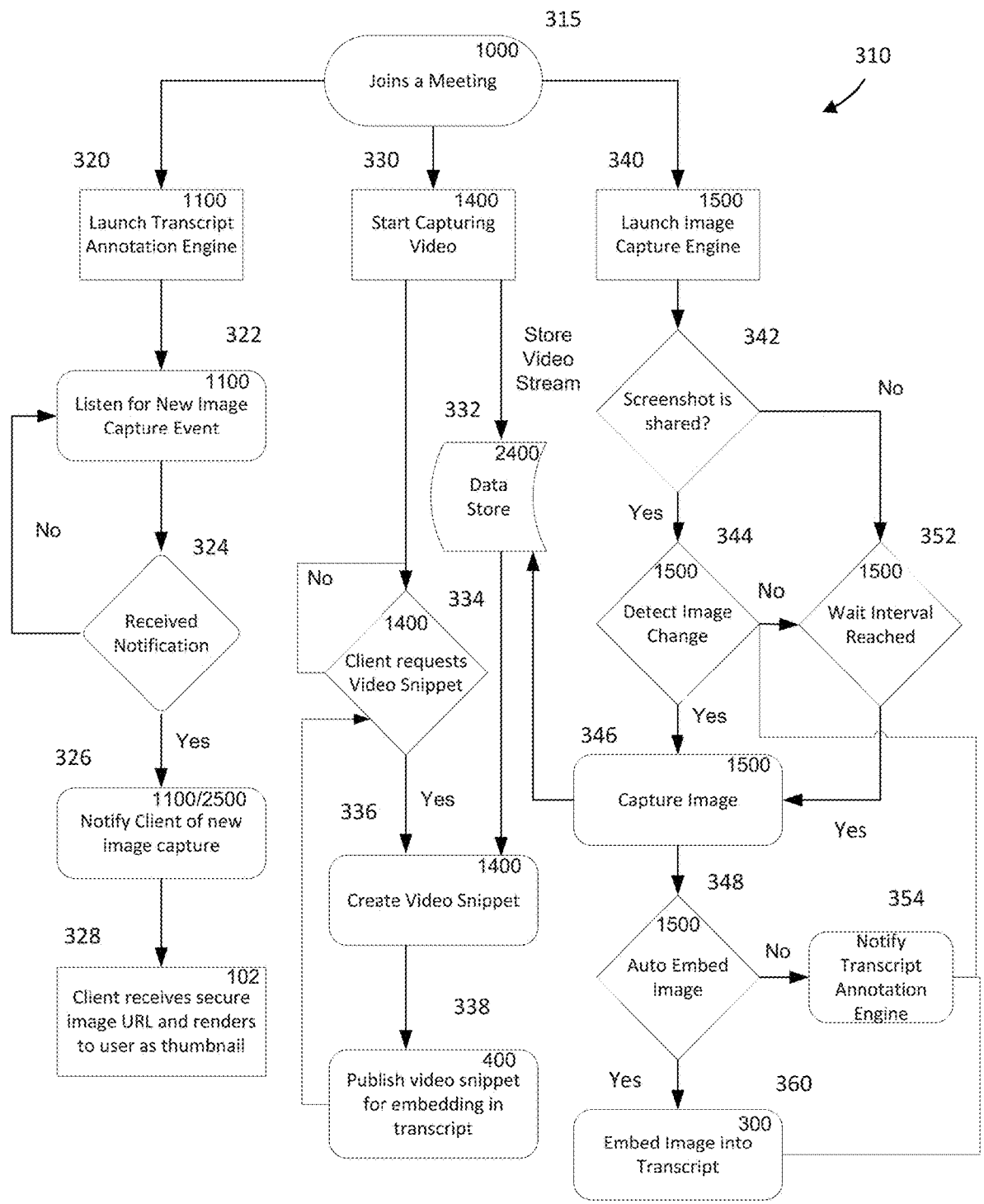
FIG. 4 is a simplified diagram showing a method for embedding visual data into a live transcript of a live conversation according to various embodiments of the present disclosure.

FIG. 4 is a simplified diagram showing a method 310 for embedding visual data into a live transcript of a live conversation according to various embodiments of the present disclosure. This diagram is merely an example, which should not unduly limit the scope of the claims. One of ordinary skill in the art would recognize many variations, alternatives, and modifications. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

According to some embodiments, the method 310 includes a process 315 of a virtual assistant (e.g., the virtual assistant 1000) joining a meeting, a process 320 of launching transcript annotation engine (e.g., the transcript annotation engine 1100), a process 322 of listening for new image capture event (e.g., via the transcript annotation engine 1100), a process 324 of determining whether a notification of a new image capture event is received, a process 326 of notifying one or more clients (e.g., via client module 102) of new image capture (e.g., via the transcript annotation engine 1100 and/or the secure web server 2500), and a process 328 of a client device receiving secure image URL (Uniform Resource Locator) and rendering to user as thumbnail (e.g., via the client device 102).

According to certain embodiments, the method 310 includes a process 330 of starting to capture videos (e.g., via the video capturing module 1400), a process 332 of storing one or more videos (e.g., a video stream) to a data repository (e.g., the data store 2400), a process 334 of receiving client requests of video snippets (e.g., via the video capturing module 1400), a process 336 of creating video snippets (e.g., via the video capturing module 1400), and a process 338 of publishing video snippets for embedding in one or more transcripts (e.g., via the Pub Sub module 400).

According to some embodiments, the method 310 includes a process 340 of launching image capture engine (e.g., the image capturing engine 1500), a process 342 of determining whether one or more screenshots are shared, a process 344 of detecting image change (e.g., via the image capturing engine 1500), a process 346 of capturing one or more images (e.g., via the image capturing engine 1500), and a process 348 of whether to automatically embed images, and a process 360 of embedding (e.g., automatically embedding) the one or more images to one or more transcripts (e.g., via the API server 300).

According to certain embodiments, the method 310 includes a process 352 of waiting interval reached (e.g., via the image capturing engine 1500) and a process 354 of notifying transcript annotation engine (e.g., the transcript annotation engine 1100). In some embodiments, the image capture occurs at a regular time interval (e.g., every 30 seconds, every 1 minute, etc.). In certain embodiments, when the interval is reached, the method 310 will go to process 346 to capture one or more images and/or video.

Figure 5:
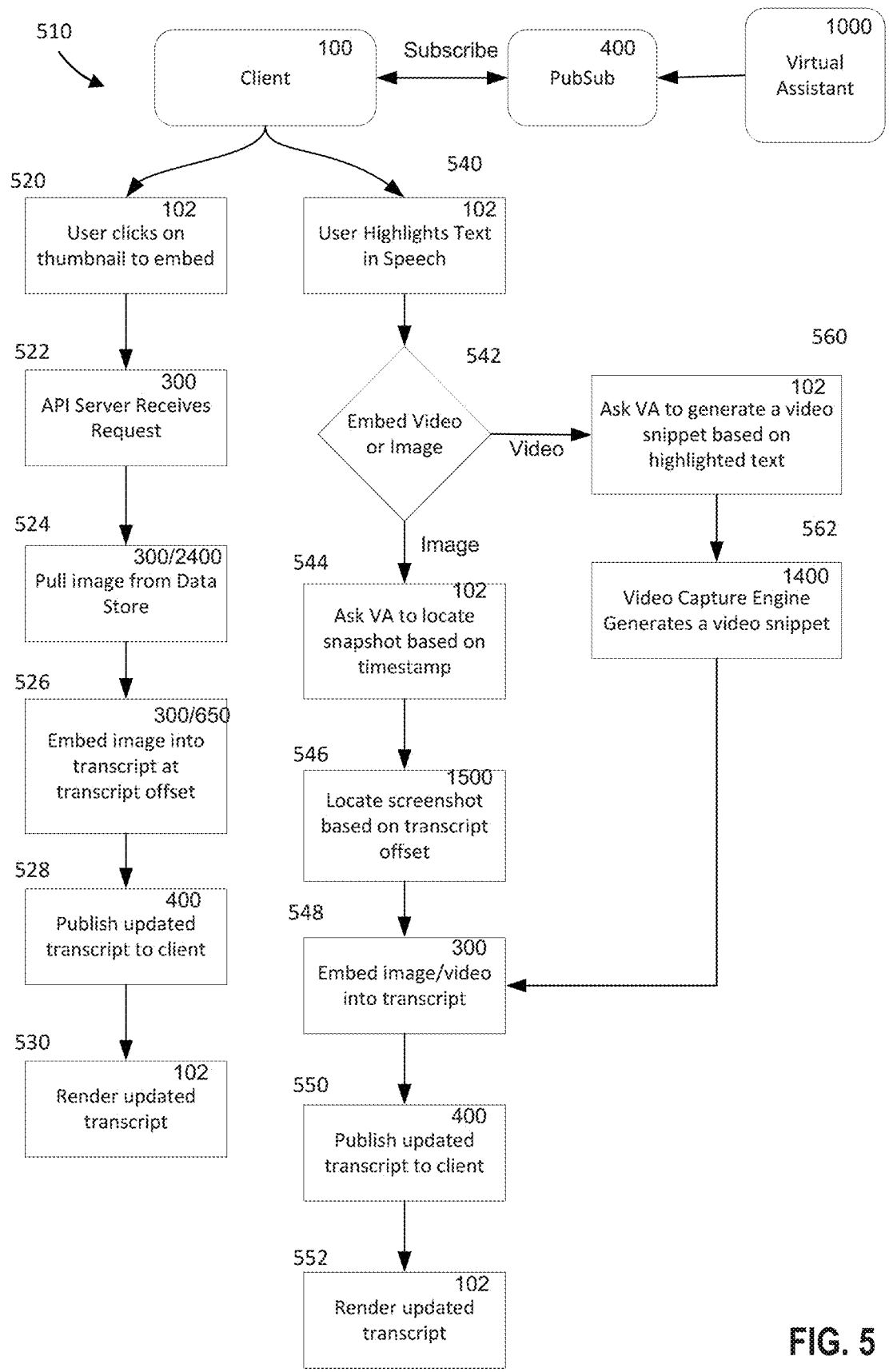
FIG. 5 is a simplified diagram showing a method for embedding visual data into a transcript of a recorded conversation according to various embodiments of the present disclosure.

FIG. 5 is a simplified diagram showing a method 510 for embedding visual data into a transcript of a recorded conversation according to various embodiments of the present disclosure. This diagram is merely an example, which should not unduly limit the scope of the claims. One of ordinary skill in the art would recognize many variations, alternatives, and modifications. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

According to certain embodiments, the method 510 includes a process 520 of receiving an input from a user (e.g., user clicking thumbnail to embed) (e.g., via the client module 102), a process 522 of AIP server (e.g., the AIP server 300) receiving request, a process 524 of pulling images from data store (e.g., via the AIP server 300, from the data store 2400), a process 526 of embedding image into transcript at a time offset (e.g., the transcript offset) (e.g., via the API server 300, from the data repository 650), a process 528 of publishing updated transcript to client (e.g., via the Pub Sub server 400), and a process 530 of rending updated transcript (e.g., via the client module 102).

According to some embodiments, the method 510 includes a process 540 of receiving highlights from a user (e.g., user highlighting text in speech or speech transcript) (e.g., via the client module 102), a process 542 of determining whether to embedding video or image, a process 544 of asking the virtual assistant (VA) to locate snapshot based on timestamp, a process 546 of locating one or more screenshots based on one or more transcript offsets (e.g., via the image capturing module 1500), a process 548 of embedding one or more images (e.g., screenshots) and/or one or more videos into transcript (e.g., via the API server 300), a process 550 of publishing updated transcripts to client (e.g., via the Pub Sub module 400), and a process 551 of rendering updated transcript (e.g., via the client module 102).

According to certain embodiments, the method 510 includes a process 560 of asking the virtual assistant (VA) to locate a video snapshot based on highlighted text, a process 562 of video capture engine (e.g., the video capturing engine 1400) generating a video snippet, a process 548 of embedding one or more images (e.g., screenshots) and/or one or more videos (e.g., one or more video snippet) into transcript (e.g., via the API server 300), a process 550 of publishing updated transcripts to client (e.g., via the PubSub module 400), and a process 551 of rendering updated transcript (e.g., via the client module 102).

Figure 6:
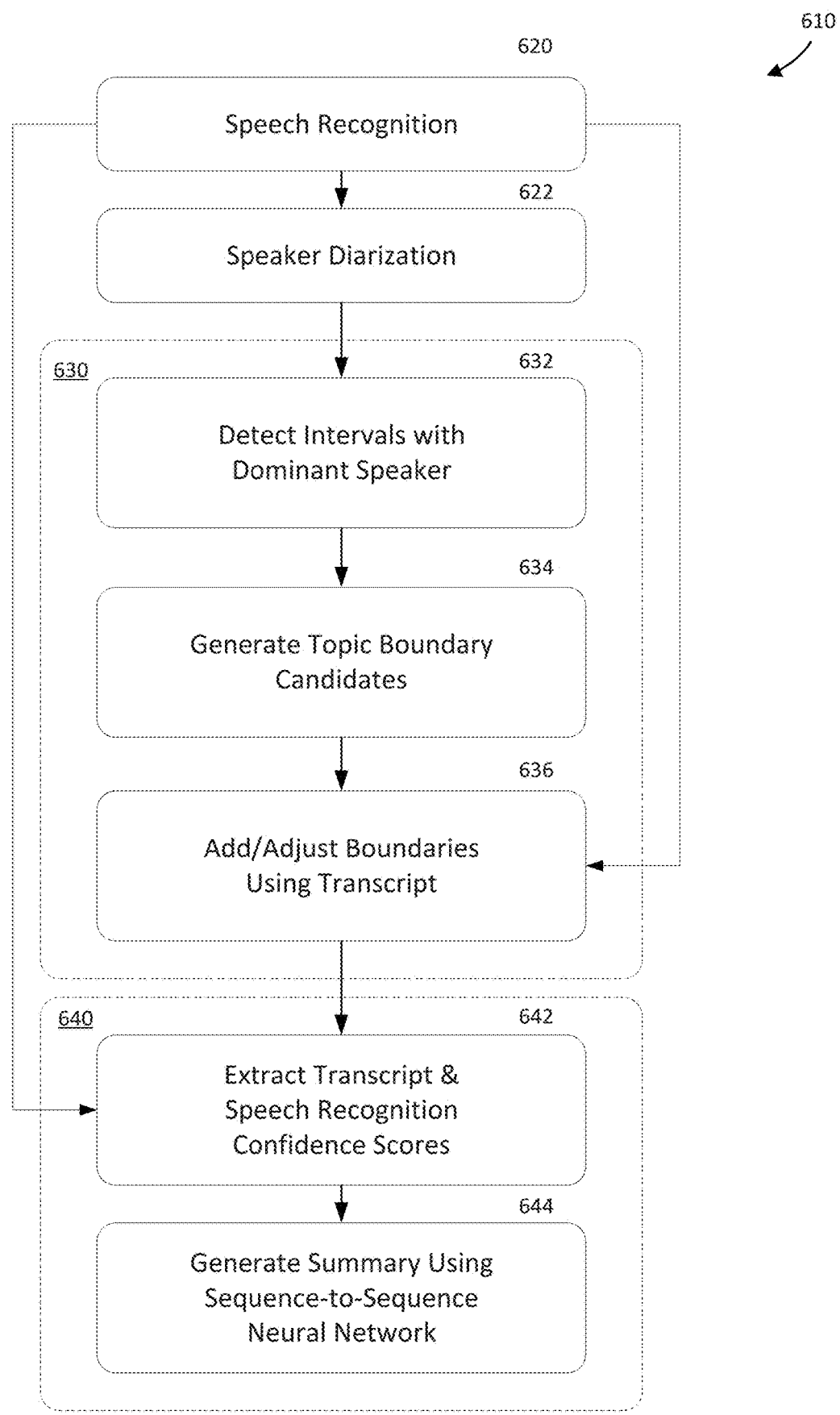
FIG. 6 is a simplified diagram showing a method for generating conversation summaries based at least in part upon topic boundary detection according to various embodiments of the present disclosure.

FIG. 6 is a simplified diagram showing a method 610 for generating conversation summaries based at least in part upon topic boundary detection according to various embodiments of the present disclosure. This diagram is merely an example, which should not unduly limit the scope of the claims. One of ordinary skill in the art would recognize many variations, alternatives, and modifications. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing device or a processor directed by instructions stored in memory. As an example, some or all processes of the method are performed according to instructions stored in a non-transitory computer-readable medium.

According to some embodiments, the method 610 includes a process 620 of speech recognition (e.g., to generate a transcript), a process 622 of speaker diarization (e.g., partitioning an audio stream containing human speech into one or more segments according to the identity of each speaker), a process 630 of topic boundary detection, and a process 640 of topic summary generation. In certain embodiments, the process 630 includes a process 632 of detecting intervals with one or more dominant speakers, a process 634 of generating topic boundary candidates, and a process 636 of adding and/or adjusting topic boundaries using transcript (e.g., the set of text generated from audio data). In some embodiments, the process 640 includes a process 642 of extracting and/or determining one or more transcript and/or speech recognition confidence scores, and a process 644 of generating summary using sequence-to-sequence neural network.

Figure 7:
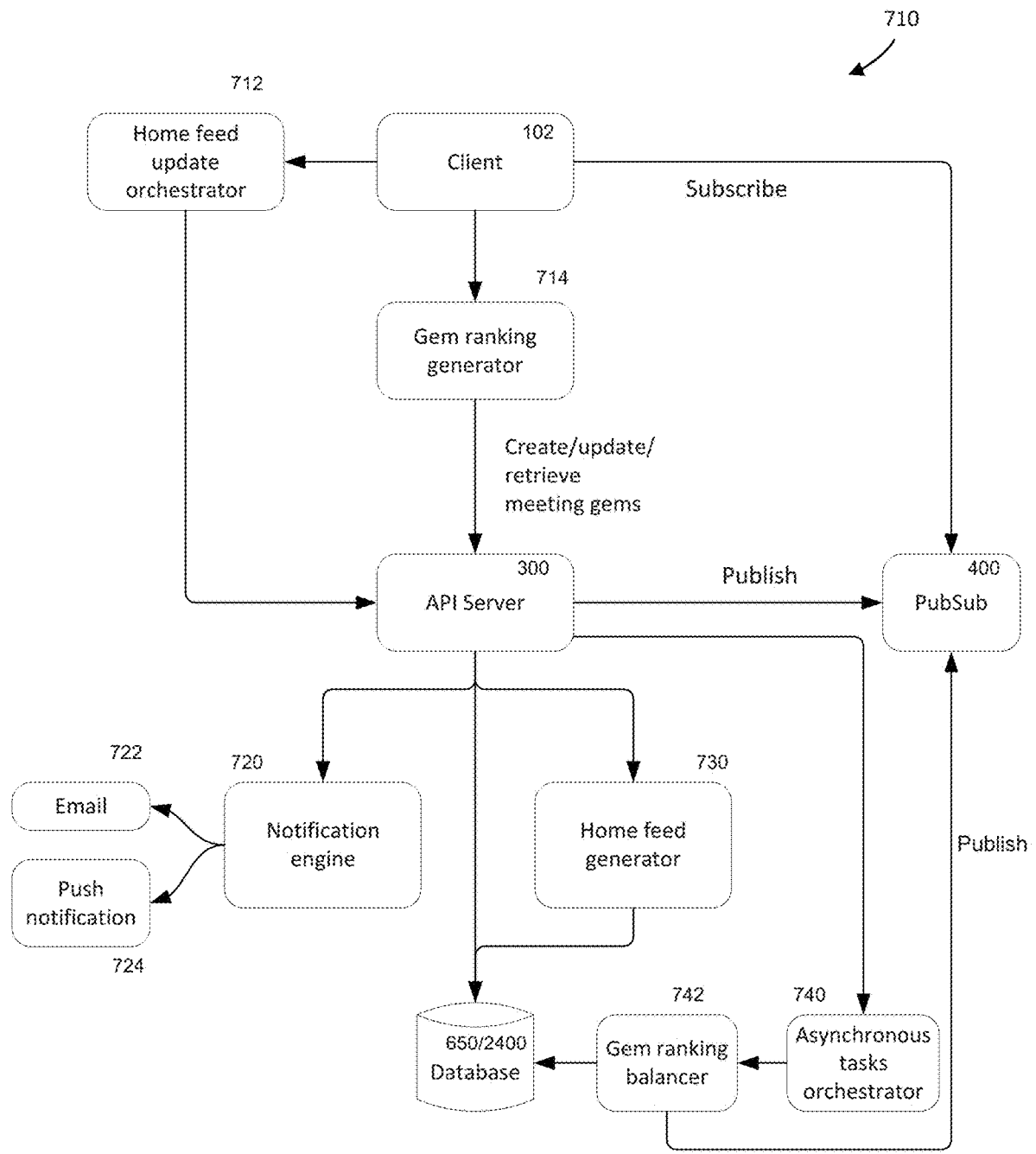
FIG. 7 is a simplified diagram showing a system for generating and presenting annotation summaries according to various embodiments of the present disclosure.

FIG. 7 is a simplified diagram showing a system 710 for generating and presenting annotation summaries according to various embodiments of the present disclosure. This diagram is merely an example, which should not unduly limit the scope of the claims. One of ordinary skill in the art would recognize many variations, alternatives, and modifications. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

According to certain embodiments, the system 710 includes one or more client modules 102 (e.g., running on one or more client devices), a home feed update orchestrator 712, a gem ranking generator 714 to create, update, and/or retrieve one or more meeting gems (e.g., one or more meeting topics, one or more conversation topics, one or more topic headings, one or more visual data, etc.), the API server 300, the Pub Sub server 400, a notification engine 720, a hood feed generator 730, an asynchronous tasks orchestrator 740, a gem ranking balancer 742, and the data repository 650 and/or 2400. In some embodiments, the client module 102 may subscribe and/or submit one or more subscriptions to the Pub Sub module 400.

In certain embodiments, the API server 300 may publish one or more transcripts and/or one or more annotated transcripts to the Pub Sub module 400. In some embodiments, when a transcript, an annotated transcript, an updated transcript, and/or an updated annotated transcript is published to the Pub Sub module 400, the client module 102 subscribed to the Pub Sub module 400 may receive the transcript, the annotated transcript, the updated transcript, and/or the updated annotated transcript. In certain embodiments, the gem ranking balancer 742 can publish visual data and/or topic headings to the Pub Sub module 400. In some embodiments, the notification engine 720 may transmit one or more emails 722 and/or one or more push notifications 724.

Figure 8:
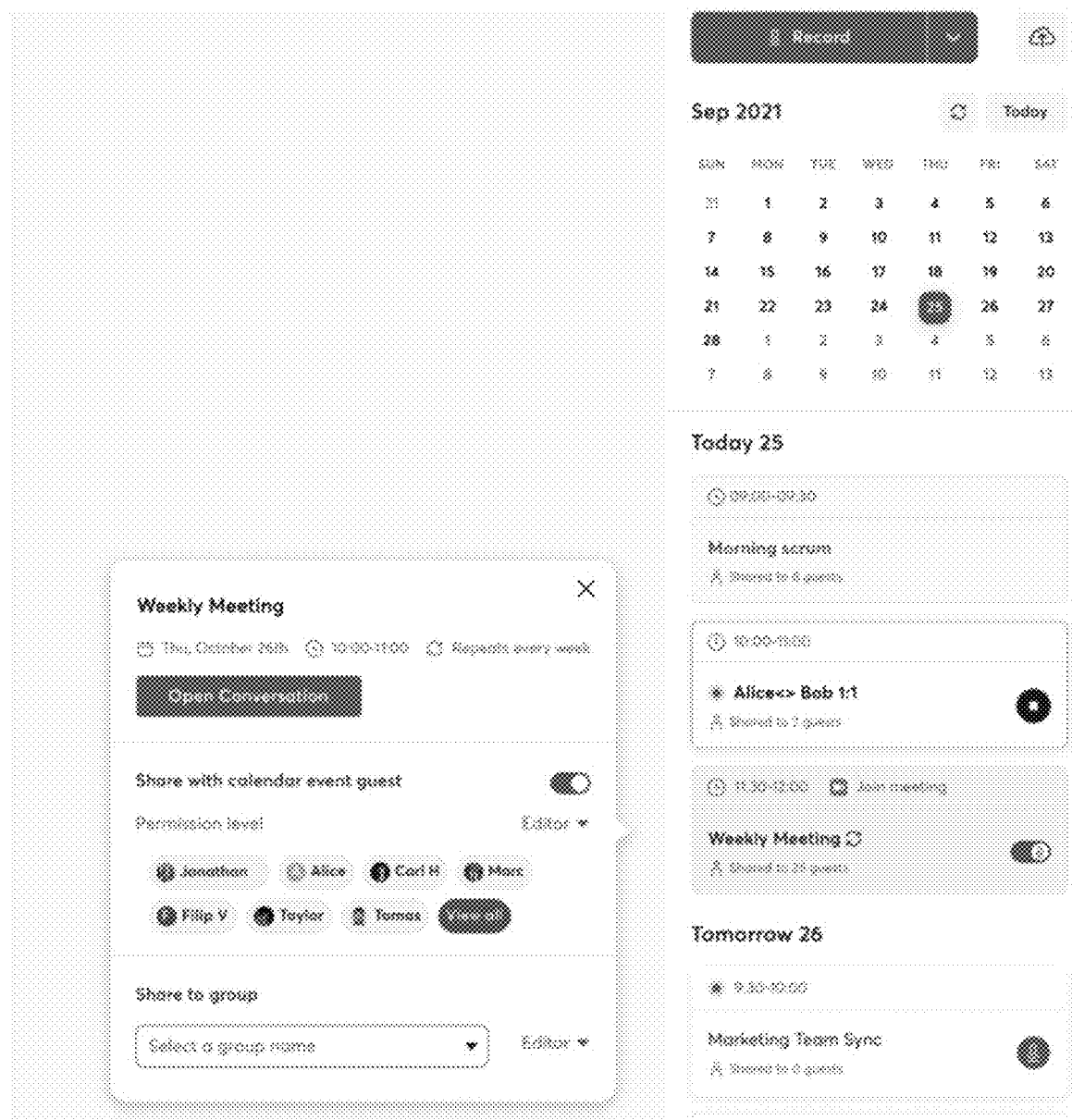
FIG. 8 is a simplified diagram showing a user interface with calendar integration according to various embodiments of the present disclosure.

FIG. 8 is a simplified diagram showing a user interface with calendar integration according to various embodiments of the present disclosure. One of ordinary skill in the art would recognize many variations, alternatives, and modifications. As depicted in accordance with various embodiments, systems and/or methods of the present disclosure may enable a user (e.g., via a client device) to view scheduled conversations, to join conversations, to control whether to enable a virtual assistant (e.g., a virtual conversation participant), to share a conversation, and/or to access a conversation page, which may include recorded audio data, visual data, transcript, and/or annotations.

FIG. 9 is a simplified diagram showing a user interface with a reminder according to various embodiments of the present disclosure. One of ordinary skill in the art would recognize many variations, alternatives, and modifications. As depicted in accordance with various embodiments, systems and/or methods of the present disclosure may generate and present a reminder to include useful information to a user, including action items and task assignments.

Figure 10:
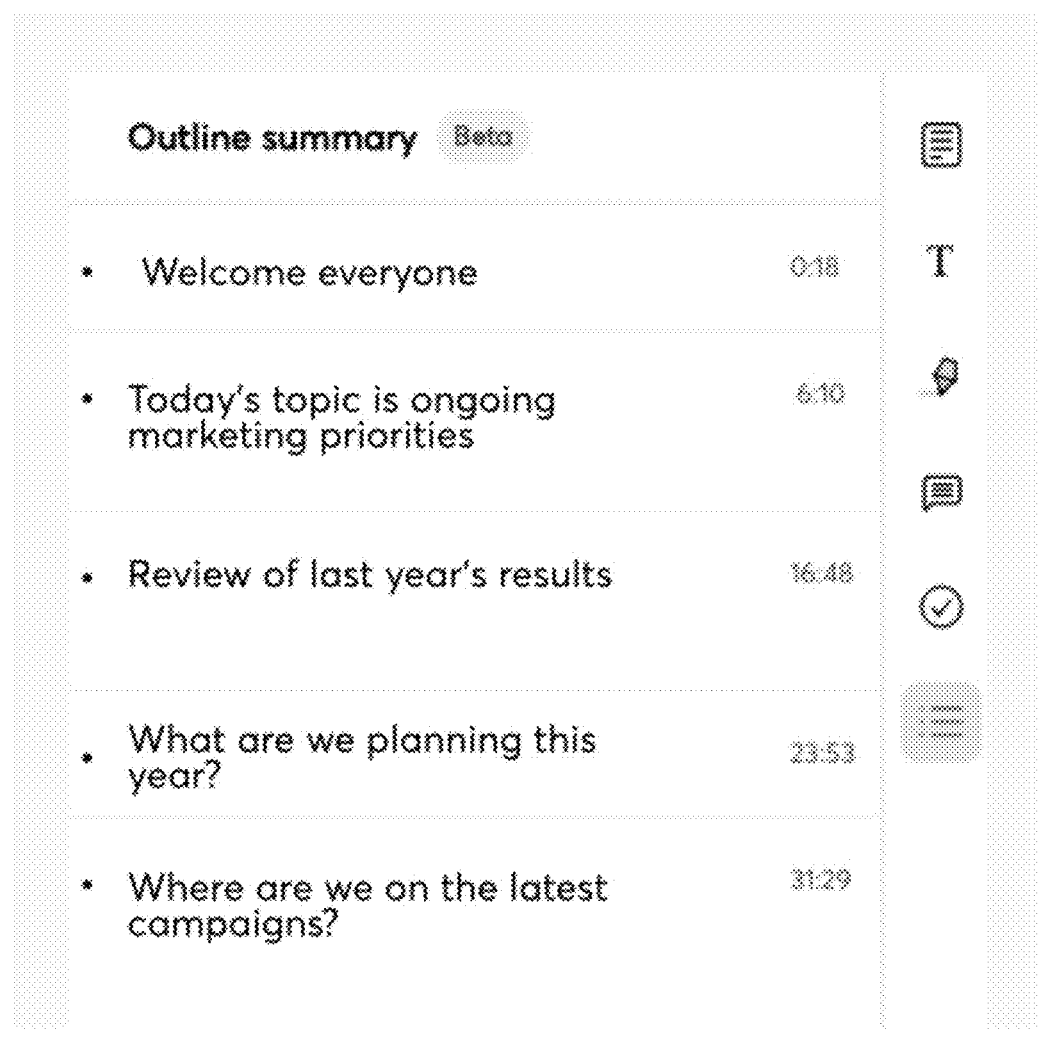

FIG. 10 is a simplified diagram showing a user interface with a conversation outline according to various embodiments of the present disclosure. One of ordinary skill in the art would recognize many variations, alternatives, and modifications. As depicted in accordance with various embodiments, systems and/or methods of the present disclosure may generate and present a conversation outline to identify conversation topics associated with the conversation and their start times.

Figure 11:
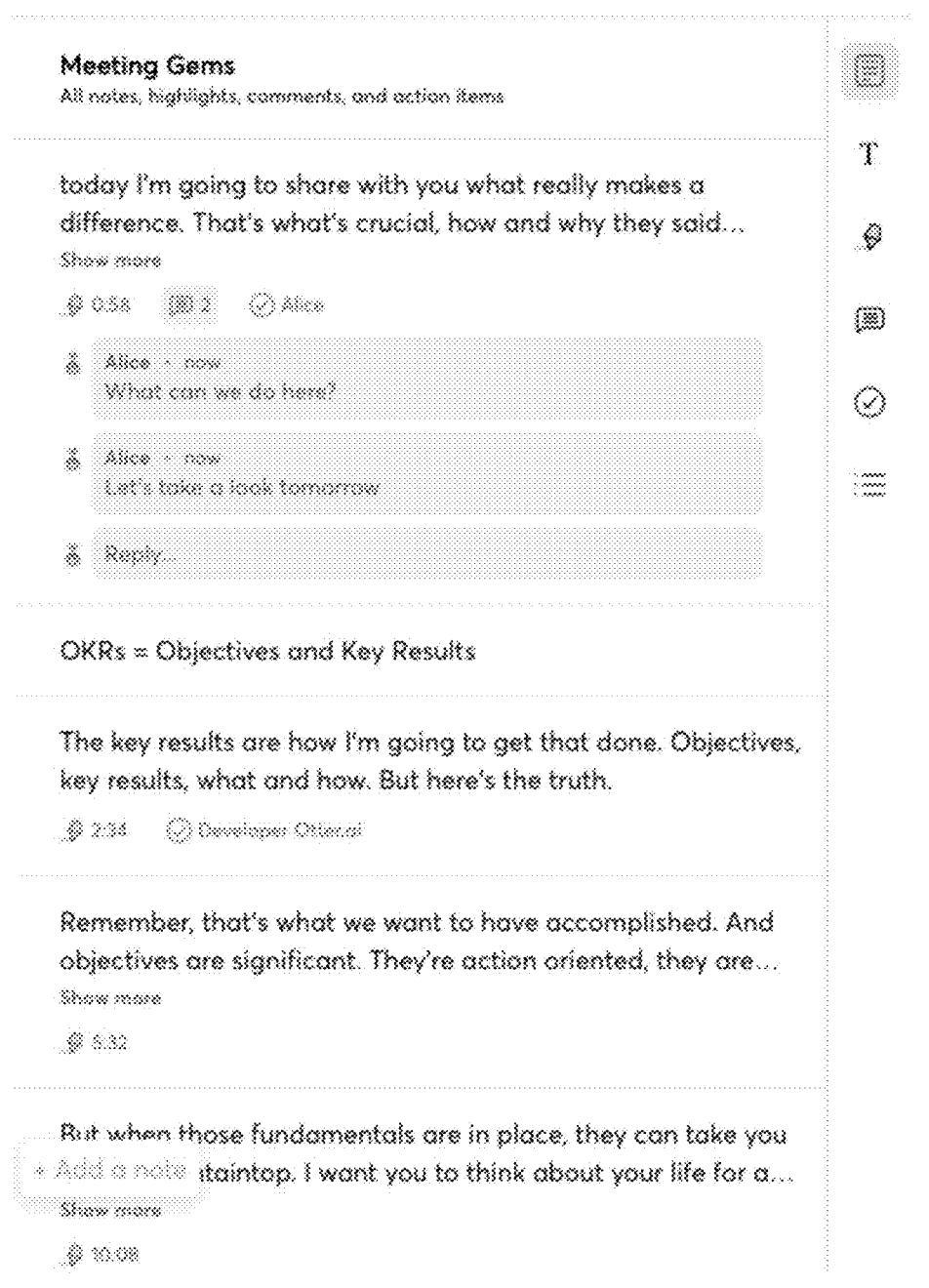

FIG. 11 is a simplified diagram showing a user interface with an annotation summary according to various embodiments of the present disclosure. One of ordinary skill in the art would recognize many variations, alternatives, and modifications. As depicted in accordance with various embodiments, systems and/or methods of the present disclosure may generate and present a conversation summary to identify highlights, text notes, comments, and/or action items associated with a conversation.

According to certain embodiments, a computer-implemented method for presenting a conversation, the method comprising: obtaining, via a virtual participant, a set of audio data associated with a conversation while the conversation occurs; transcribing, via the virtual participant, the set of audio data into a set of text data while the conversation occurs; obtaining a set of annotations associated with the set of text data while the conversation occurs; identifying one or more topic transitions based at least in part upon the set of text data; generating a conversation summary based at least in part upon the one or more topic transitions; obtaining a set of visual data associated with the conversation, each visual data of the set of visual data corresponding to a timestamp; and presenting the set of annotations, the conversation summary, and the set of visual data embedded in the set of text data to a group of actual participants. For example, the method is implemented according to at least FIG. 1, FIG. 2, FIG. 3, FIG. 4, FIG. 5, FIG. 6, and/or FIG. 7.

In some embodiments, the method further includes generating a plurality of headings for a plurality of conversation topics based at least in part on the set of text data and the one or more topic transitions; where the conversation summary includes the plurality of headings. In certain embodiments, the generating a plurality of headings comprises generating at least one of the plurality of headings based at least in part on one or more key words. In some embodiments, the generating a plurality of headings comprises applying a machine learning model to the set of text data to generate at least one of the plurality of headings.

In certain embodiments, the machine learning model includes a sequence-to-sequence machine learning model or a sequence-to-sequence neural network. In some embodiments, the method further includes receiving an input from a user; and updating time information for one of the plurality of conversation topics based on the input; wherein the time information includes at least one selected from a group consisting of a start time, an end time and a transition time. In certain embodiments, the method further includes generating metadata associated with each visual data of the set of visual data; wherein the metadata includes at least one selected from a group consisting of a link to a respective visual data and a time offset for the respective visual data from a beginning of the conversation.

In some embodiments, the respective visual data is embedded in the set of text data based at least in part on the time offset. In certain embodiments, the obtaining a set of visual data associated with the conversation comprises automatically obtaining the set of visual data. In some embodiments, the obtaining a set of visual data associated with the conversation comprises: capturing a sequence of visual data at regular time intervals; receiving an input associated with one visual data in the sequence of visual data; and selecting the one visual data based on the input; and embedding the one selected visual data in the set of text data.

In certain embodiments, the receiving an input associated with one visual data in the sequence of visual data comprises receiving the input associated with a thumbnail representing the one visual data in the sequence of visual data. In some embodiments, the method includes a process (not illustrated) of embedding at least one of the set of visual data to the set of text data at a time prior to a current time of the conversation. In certain embodiments, the method includes a process of generating an annotation summary including the one or more annotations and one or more corresponding timestamps.

In some embodiments, the method includes receiving a selection of an annotation from the one or more annotations; and identifying a conversation segment associated with the selected annotation. In certain embodiments, the identifying one or more topic transitions comprises at least selected from a group consisting of: identifying a change in speakers;

identifying a change in screenshare; identifying a change in cue words; identifying a pause in a conversation; and identifying a change in sematic meaning of two or more conversation segments. In some embodiments, the method includes identifying a first speaker associated with a first audio channel; and identifying a second speaker associated with a second audio channel, the second audio channel being different from the first audio channel; wherein the identifying one or more topic transitions comprises identifying the one or more topic transitions based at least in part on the identified first speaker and the identified second speaker.

According to some embodiments, a computing system for presenting a conversation, the computing system comprising: one or more processors; and a memory storing instructions that, upon execution by the one or more processors, cause the computing system to perform one or more processes including: obtaining, via a virtual participant, a set of audio data associated with a conversation while the conversation occurs; transcribing, via the virtual participant, the set of audio data into a set of text data while the conversation occurs; obtaining a set of annotations associated with the set of text data while the conversation occurs; identifying one or more topic transitions based at least in part upon the set of text data; generating a conversation summary based at least in part upon the one or more topic transitions; obtaining a set of visual data associated with the conversation, each visual data of the first set of visual data corresponding to a timestamp; and presenting the set of annotations, the conversation summary, and first set of visual data embedded in the first set of text data to a group of actual participants. For example, the method is implemented according to at least FIG. 1, FIG. 2, FIG. 3, FIG. 4, FIG. 5, FIG. 6, and/or FIG. 7.

In some embodiments, the one or more process further include generating a plurality of headings for a plurality of conversation topics based at least in part on the set of text data and the one or more topic transitions; where the conversation summary includes the plurality of headings. In certain embodiments, the generating a plurality of headings comprises generating at least one of the plurality of headings based at least in part on one or more key words. In some embodiments, the generating a plurality of headings comprises applying a machine learning model to the set of text data to generate at least one of the plurality of headings.

In certain embodiments, the machine learning model includes a sequence-to-sequence machine learning model or a sequence-to-sequence neural network. In some embodiments, the method further includes receiving an input from a user; and updating time information for one of the plurality of conversation topics based on the input; wherein the time information includes at least one selected from a group consisting of a start time, an end time and a transition time. In certain embodiments, the method further includes generating metadata associated with each visual data of the set of visual data; wherein the metadata includes at least one selected from a group consisting of a link to a respective visual data and a time offset for the respective visual data from a beginning of the conversation.

In some embodiments, the respective visual data is embedded in the set of text data based at least in part on the time offset. In certain embodiments, the obtaining a set of visual data associated with the conversation comprises automatically obtaining the set of visual data. In some embodiments, the obtaining a set of visual data associated with the conversation comprises: capturing a sequence of visual data at regular time intervals; receiving an input associated with one visual data in the sequence of visual data; and selecting the one visual data based on the input; and embedding the one selected visual data in the set of text data.

In certain embodiments, the receiving an input associated with one visual data in the sequence of visual data comprises receiving the input associated with a thumbnail representing the one visual data in the sequence of visual data. In some embodiments, the method includes a process (not illustrated) of embedding at least one of the set of visual data to the set of text data at a time prior to a current time of the conversation. In certain embodiments, the method includes a process of generating an annotation summary including the one or more annotations and one or more corresponding timestamps.

In some embodiments, the method includes receiving a selection of an annotation from the one or more annotations; and identifying a conversation segment associated with the selected annotation. In certain embodiments, the identifying one or more topic transitions comprises at least selected from a group consisting of: identifying a change in speakers; identifying a change in screenshare; identifying a change in cue words; identifying a pause in a conversation; and identifying a change in sematic meaning of two or more conversation segments. In some embodiments, the method includes identifying a first speaker associated with a first audio channel; and identifying a second speaker associated with a second audio channel, the second audio channel being different from the first audio channel; wherein the identifying one or more topic transitions comprises identifying the one or more topic transitions based at least in part on the identified first speaker and the identified second speaker.

According to some embodiments, a non-transitory computer-readable medium storing instructions for presenting a conversation, the instructions upon execution by one or more processors of a computing system, cause the computing system to perform one or more processes including: obtaining, via a virtual participant, a set of audio data associated with a conversation while the conversation occurs; transcribing, via the virtual participant, the first set of audio data into a first set of text data while the conversation occurs; obtaining a set of annotations associated with the set of text data while the conversation occurs; identifying one or more topic transitions based at least in part upon the set of text data; generating a conversation summary based at least in part upon the one or more topic transitions; obtaining a first set of visual data associated with the conversation, each visual data of the first set of visual data corresponding to a timestamp; and presenting the set of annotations, the conversation summary, and the set of visual data embedded in the set of text data to a group of actual participants. For example, the method is implemented according to at least FIG. 1, FIG. 2, FIG. 3, FIG. 4, FIG. 5, FIG. 6, and/or FIG. 7.

According to certain embodiments, a computer-implemented method for presenting a conversation, the method comprising: obtaining, via a virtual participant, a set of audio data associated with a conversation while the conversation occurs; transcribing, via the virtual participant, the set of audio data into a set of text data while the conversation occurs; obtaining a set of annotations associated with the set of text data while the conversation occurs; identifying one or more topic transitions based at least in part upon the set of text data; generating a plurality of headings for a plurality of conversation topics based at least in part on the set of text data and the one or more topic transitions by applying a machine learning model to the set of text data; generating a conversation summary based at least in part upon the one or more topic transitions, the conversation summary including the plurality of headings; obtaining a set of visual data associated with the conversation, each visual data of the set of visual data corresponding to a timestamp; and presenting the set of annotations, the conversation summary, and the set of visual data embedded in the set of text data to a group of actual participants; wherein the identifying one or more topic transitions comprises at least selected from a group consisting of: identifying a change in speakers; identifying a change in screenshare; identifying a change in cue words; identifying a pause in a conversation; and identifying a change in sematic meaning of two or more conversation segments. For example, the method is implemented according to at least FIG. 1, FIG. 2, FIG. 3, FIG. 4, FIG. 5, FIG. 6, and/or FIG. 7.

In certain embodiments, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., SSD, RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for presenting a conversation, the method comprising:
   obtaining, via a virtual participant, a set of audio data associated with a conversation while the conversation occurs;
   transcribing, via the virtual participant, the set of audio data into a set of text data while the conversation occurs;
   obtaining a set of annotations associated with the set of text data while the conversation occurs;
   identifying one or more topic transitions based at least in part upon the set of text data;
   generating a plurality of headings for a plurality of conversation topics based at least in part on the set of text data and the one or more topic transitions, the generating a plurality of headings including applying a machine learning model to the set of text data to generate at least one of the plurality of headings;
   generating a conversation summary including the plurality of headings based at least in part upon the one or more topic transitions;
   obtaining a set of visual data associated with the conversation, each visual data of the set of visual data corresponding to a timestamp; and
   presenting the set of annotations, the conversation summary, and the set of visual data embedded in the set of text data to a group of actual participants.

2. The computer-implemented method of claim 1, wherein the generating a plurality of headings comprises generating at least one of the plurality of headings based at least in part on one or more key words.

3. The computer-implemented method of claim 1, wherein the machine learning model includes a sequence-to-sequence machine learning model or a sequence-to-sequence neural network.

4. The computer-implemented method of claim 1, further comprising:
   receiving an input from a user; and
   updating time information for one of the plurality of conversation topics based on the input;
   wherein the time information includes at least one selected from a group consisting of a start time, an end time and a transition time.

5. The computer-implemented method of claim 1, further comprising:

generating metadata associated with each visual data of the set of visual data;
wherein the metadata includes at least one selected from a group consisting of a link to a respective visual data and a time offset for the respective visual data from a beginning of the conversation.

6. The computer-implemented method of claim 5, wherein the respective visual data is embedded in the set of text data based at least in part on the time offset.

7. The computer-implemented method of claim 1, wherein the obtaining a set of visual data associated with the conversation comprises automatically obtaining the set of visual data.

8. The computer-implemented method of claim 1, wherein the obtaining a set of visual data associated with the conversation comprises:
capturing a sequence of visual data at regular time intervals;
receiving an input associated with one visual data in the sequence of visual data;
selecting the one visual data based on the input; and
embedding the one selected visual data in the set of text data.

9. The computer-implemented method of claim 8, wherein the receiving an input associated with one visual data in the sequence of visual data comprises receiving the input associated with a thumbnail representing the one visual data in the sequence of visual data.

10. The computer-implemented method of claim 1, further comprising:
embedding at least one of the set of visual data to the set of text data at a time prior to a current time of the conversation.

11. The computer-implemented method of claim 1, further comprising:
generating an annotation summary including the one or more annotations and one or more corresponding timestamps.

12. The computer-implemented method of claim 11, further comprising:
receiving a selection of an annotation from the one or more annotations; and
identifying a conversation segment associated with the selected annotation.

13. The computer-implemented method of claim 1, wherein the identifying one or more topic transitions comprises at least selected from a group consisting of:
identifying a change in speakers;
identifying a change in screenshare;
identifying a change in cue words;
identifying a pause in a conversation; and
identifying a change in semantic meaning of two or more conversation segments.

14. The computer-implemented method of claim 1, further comprising:
identifying a first speaker associated with a first audio channel; and
identifying a second speaker associated with a second audio channel, the second audio channel being different from the first audio channel;
wherein the identifying one or more topic transitions comprises identifying the one or more topic transitions based at least in part on the identified first speaker and the identified second speaker.

15. A computing system for presenting a conversation, the computing system comprising:
one or more processors; and
a memory storing instructions that, upon execution by the one or more processors, cause the computing system to perform one or more processes comprising:
obtaining, via a virtual participant, a set of audio data associated with a conversation while the conversation occurs;
transcribing, via the virtual participant, the set of audio data into a set of text data while the conversation occurs;
obtaining a set of annotations associated with the set of text data while the conversation occurs;
identifying one or more topic transitions based at least in part upon the set of text data;
generating a plurality of headings for a plurality of conversation topics based at least in part on the set of text data and the one or more topic transitions, the generating a plurality of headings including applying a machine learning model to the set of text data to generate at least one of the plurality of headings;
generating a conversation summary including the plurality of headings based at least in part upon the one or more topic transitions;
obtaining a set of visual data associated with the conversation, each visual data of the set of visual data corresponding to a timestamp; and
presenting the set of annotations, the conversation summary, and the set of visual data embedded in the set of text data to a group of actual participants.

16. The computing system of claim 15, wherein the generating a plurality of headings comprises generating at least one of the plurality of headings based at least in part on one or more key words.

17. The computing system of claim 15, wherein the machine learning model includes a sequence-to-sequence machine learning model or a sequence-to-sequence neural network.

18. The computing system of claim 15, wherein the one or more processes further comprise:
receiving an input from a user; and
updating time information for one of the plurality of conversation topics based on the input;
wherein the time information includes at least one selected from a group consisting of a start time, an end time and a transition time.

19. The computing system of claim 15, wherein the one or more processes further comprise:
generating metadata associated with each visual data of the set of visual data;
wherein the metadata includes at least one selected from a group consisting of a link to a respective visual data and a time offset for the respective visual data from a beginning of the conversation.

20. The computing system of claim 19, wherein the respective visual data is embedded in the set of text data based at least in part on the time offset.

21. The computing system of claim 15, wherein the obtaining a set of visual data associated with the conversation comprises automatically obtaining the set of visual data.

22. The computing system of claim 15, wherein the obtaining a set of visual data associated with the conversation comprises:
capturing a sequence of visual data at regular time intervals;
receiving an input associated with one visual data in the sequence of visual data;
selecting the one visual data based on the input; and embedding the one selected visual data in the set of text data.

23. The computing system of claim 22, wherein the receiving an input associated with one visual data in the sequence of visual data comprises receiving the input associated with a thumbnail representing the one visual data in the sequence of visual data.

24. The computing system of claim 15, further comprising:
    embedding at least one of the set of visual data to the set of text data at a time prior to a current time of the conversation.

25. A non-transitory computer-readable medium storing instructions for presenting a conversation, the instructions upon execution by one or more processors of a computing system, cause the computing system to perform one or more processes including:
    obtaining, via a virtual participant, a set of audio data associated with a conversation while the conversation occurs;
    transcribing, via the virtual participant, the set of audio data into a set of text data while the conversation occurs;
    obtaining a set of annotations associated with the set of text data while the conversation occurs;
    identifying one or more topic transitions based at least in part upon the set of text data;
    generating a plurality of headings for a plurality of conversation topics based at least in part on the set of text data and the one or more topic transitions, the generating a plurality of headings comprising applying a machine learning model to the set of text data to generate at least one of the plurality of headings;
    generating a conversation summary including the plurality of headings based at least in part upon the one or more topic transitions;
    obtaining a set of visual data associated with the conversation, each visual data of the set of visual data corresponding to a timestamp; and
    presenting the set of annotations, the conversation summary, and the set of visual data embedded in the set of text data to a group of actual participants.

26. A computer-implemented method for presenting a conversation, the method comprising:
    obtaining, via a virtual participant, a set of audio data associated with a conversation while the conversation occurs;
    transcribing, via the virtual participant, the set of audio data into a set of text data while the conversation occurs;
    obtaining a set of annotations associated with the set of text data while the conversation occurs;
    identifying one or more topic transitions based at least in part upon the set of text data;
    generating a plurality of headings for a plurality of conversation topics based at least in part on the set of text data and the one or more topic transitions by applying a machine learning model to the set of text data;
    generating a conversation summary based at least in part upon the one or more topic transitions, the conversation summary including the plurality of headings;
    obtaining a set of visual data associated with the conversation, each visual data of the set of visual data corresponding to a timestamp; and
    presenting the set of annotations, the conversation summary, and the set of visual data embedded in the set of text data to a group of actual participants.

\* \* \* \* \*